US010019629B2

(12) United States Patent
Lan et al.

(10) Patent No.: US 10,019,629 B2
(45) Date of Patent: Jul. 10, 2018

(54) SKELETON-BASED ACTION DETECTION USING RECURRENT NEURAL NETWORK

(71) Applicant: Microsoft Technology Licensing, LLC, Redmond, WA (US)

(72) Inventors: Cuiling Lan, Beijing (CN); Wenjun Zeng, Beijing (CN); Wentao Zhu, Beijing (CN); Junliang Xing, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 15/169,593

(22) Filed: May 31, 2016

(65) Prior Publication Data

US 2017/0344829 A1   Nov. 30, 2017

(51) Int. Cl.
*G06K 9/36* (2006.01)
*G06N 3/04* (2006.01)
(Continued)

(52) U.S. Cl.
CPC ..... *G06K 9/00718* (2013.01); *G06K 9/00369* (2013.01); *G06N 3/0445* (2013.01);
(Continued)

(58) Field of Classification Search
CPC ..... G06K 2009/00738; G06K 9/00369; G06K 9/00335–9/00355; G06T 7/251;
(Continued)

(56) References Cited

U.S. PATENT DOCUMENTS

2017/0255832 A1\*   9/2017  Jones ................. G06K 9/00771

OTHER PUBLICATIONS

Wentao Zhu et al., "Co-occurrence Feature Learning for Skeleton based Action Recognition using Regularized Deep LSTM Networks", publication eprint arXiv:1603.07772, published Mar. 2016, 9 pages total (2 bib sheets, 7 article sheets).\*

(Continued)

*Primary Examiner* — Brian Werner
(74) *Attorney, Agent, or Firm* — Schwegman Lundberg & Woessner, P.A.

(57) ABSTRACT

In implementations of the subject matter described herein, an action detection scheme using a recurrent neural network (RNN) is proposed. Joint locations for a skeleton representation of an observed entity in a frame of a video and a predefined action label for the frame are obtained to train a learning network including RNN elements and a classification element. Specifically, first weights for mapping the joint locations to a first feature for the frame generated by a first RNN element in a learning network and second weights for mapping the joint locations to a second feature for the frame generated by a second RNN element in the learning network are determined based on the joint locations and the predefined action label. The first and second weights are determined by increasing a first correlation between the first feature and a first subset of the joint locations and a second correlation between the second feature and the first subset of the joint locations. Based on the joint locations and the predefined action label, a parameter for a classification element included in the learning network is also determined by increasing a probability of the frame being associated with the predefined action label. The probability is generated by the classification element at least based on the first and second features.

20 Claims, 12 Drawing Sheets

(51) Int. Cl.
G06K 9/00 (2006.01)
G06T 7/00 (2017.01)
G06N 3/08 (2006.01)
G06K 9/62 (2006.01)

(52) U.S. Cl.
CPC .............. *G06N 3/08* (2013.01); *G06T 7/0042* (2013.01); *G06K 9/629* (2013.01); *G06K 2009/00738* (2013.01); *G06T 2207/10016* (2013.01); *G06T 2207/20076* (2013.01); *G06T 2207/20081* (2013.01); *G06T 2207/20084* (2013.01)

(58) Field of Classification Search
CPC . G06T 2207/30196; G06T 2207/30232; G06T 2207/20084; G06N 3/0445
See application file for complete search history.

(56) References Cited

OTHER PUBLICATIONS

Yong Du et al., "Hierarchical Recurrent Neural Network for Skeleton Based Action Recognition", IEEE publication, copyright 2015, pp. 1110-1118.*

* cited by examiner

_US 10,019,629 B2_

SKELETON-BASED ACTION DETECTION USING RECURRENT NEURAL NETWORK

BACKGROUND

Detection of actions or activities of various entities (e.g., humans, robots, animals, or other moving objects) has many useful applications, including surveillance, health care, human-computer interaction, intelligent robot navigation, computer games, and so on. Typically, an action classifier (model) is trained on videos related to one or more known actions. Once trained, the model may be used to process an incoming video to determine whether a particular action takes place in this video. Despite efforts over many years, effective detection of actions of entities continues to be a challenging task.

SUMMARY

In accordance with implementations of the subject matter described herein, a skeleton-based action detection scheme using a recurrent neural network (RNN) is proposed. Joint locations for a skeleton representation of an observed entity in a frame of a video and a predefined action label for the frame are obtained to train a learning network including RNN elements and a classification element. Specifically, first weights for mapping the joint locations to a first feature for the frame generated by a first RNN element in a learning network and second weights for mapping the joint locations to a second feature for the frame generated by a second RNN element in the learning network are determined based on the joint locations and the predefined action label. The first and second weights are determined by increasing a first correlation between the first feature and a first subset of the joint locations and a second correlation between the second feature and the first subset of the joint locations. Based on the joint locations and the predefined action label, a parameter for a classification element included in the learning network is also determined by increasing a probability of the frame being associated with the predefined action label. The probability is generated by the classification element at least based on the first and second features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

Figure 1:
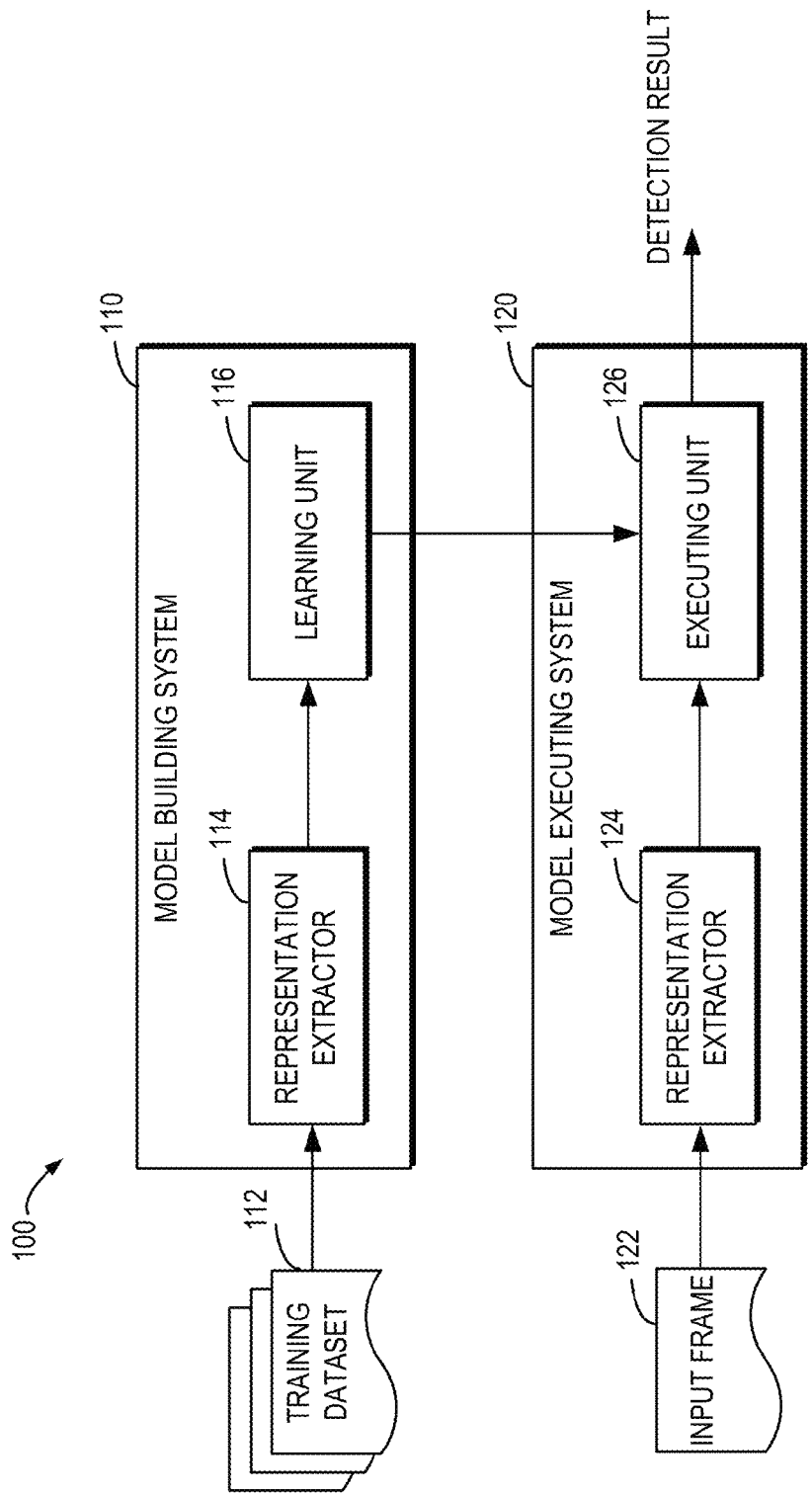
FIG. 1 illustrates a block diagram of an environment where implementations of the subject matter described herein can be implemented.

FIG. 1 shows a block diagram of an environment 100 where implementations of the subject matter described herein can be implemented. It is to be understood that the structure and functionality of the environment 100 are described only for the purpose of illustration without suggesting any limitations as to the scope of the subject matter described herein. The subject matter described herein can be embodied with a different structure or functionality.

The environment 100 includes a model building system 110 and a model executing system 120. The model building system 110 is configured to build a model for action detection from a training dataset 112. The dataset 112 may include one or more labeled videos. One or more of frames in the videos may be labeled as being associated with a predefined action of an observed entity or entities in the frames. For example, the frames may be classified as being associated with predefined actions of observed entities including drinking, eating, writing, washing hands, opening an appliance, sweeping, gargling, throwing trash, wiping, and the like. The observed entities may be, for example, humans, robots, animals, or other moving objects. Any other actions of the entities in the frames may also be recognized and labeled. The labeling of the frames may be performed automatically and/or manually. The action labels of the frames may also be provided in the dataset 112.

A representation extractor 114 included in the model building system 110 may be configured to extract representation information of respective frames in the videos in the dataset 112. Generally, the frames of the videos may not be directly used to train the model for action detection. Instead, a smaller amount of information characterizing the entity or entities in the frames may be extracted to train the model, which will help improve the accuracy and efficiency of the training process. Representation information of a frame may represent an observed entity in the frame. In some cases, if more than one entity is included in a frame, the representation information of the entity of interest may be determined. Alternatively, representation information of all the entities in the frame may be used.

In some implementations, the representation information for an entity in a frame includes a skeleton representation of the entity since it is found that different actions of an entity may be associated with different trajectories of skeleton joints of an entity. For example, the joints of "hands," "arms," and a "head" may be associated with the action "making a telephone call." A skeleton representation may include information of the joints associated with the entity, for example, two-dimensional ("2D") or three-dimensional ("3D") locations of the joints. In some examples, a location of a joint may include a relative position of the joint in the space range of the frame. Alternatively, or in addition, the location of the joint may include an orientation or angle of the joint in the frame.

Figure 2:
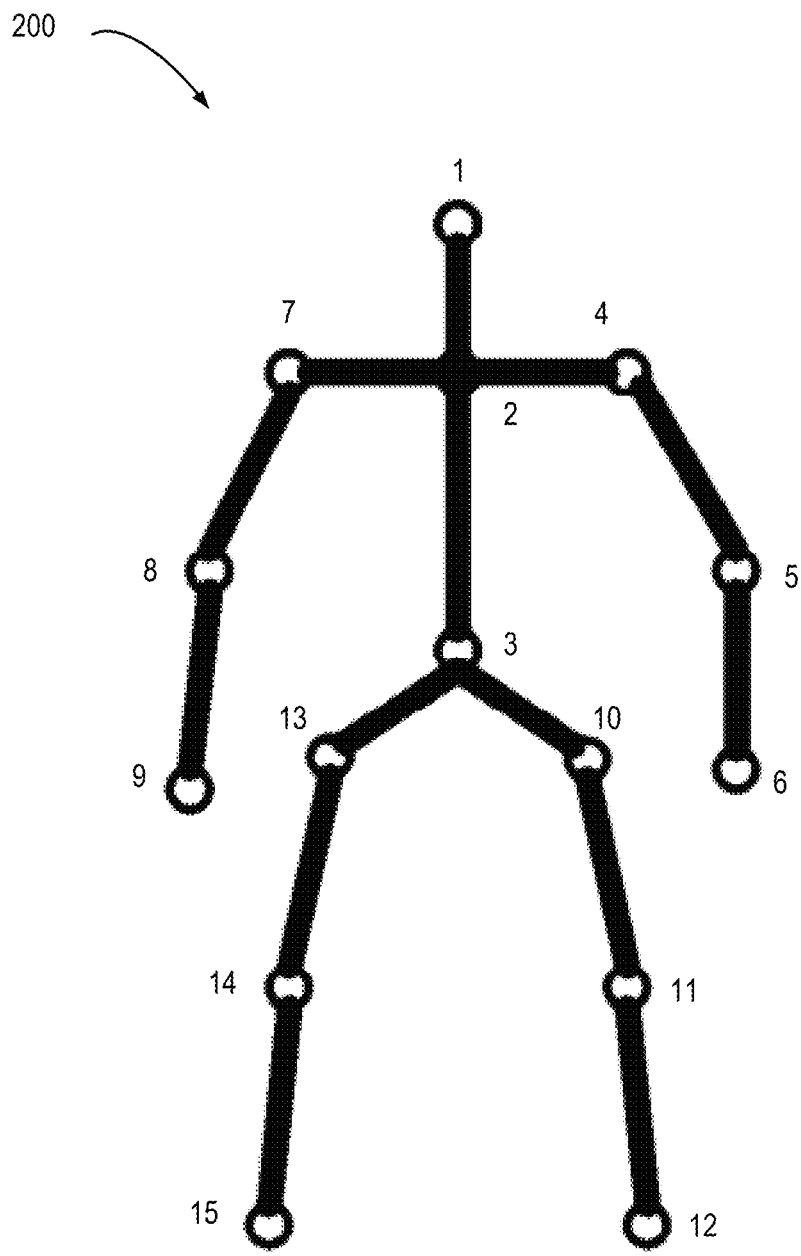
FIG. 2 illustrates a schematic diagram of a skeleton representation of a human body.

The joint locations may be obtained by identifying a skeleton structure of the entity from a 2D image of the frame or by taking the video utilizing 3D depth cameras. The joints may include but are not limited to arm joints, hands, leg joints, feet, trunk joints, head, shoulders, and so on. The number of the joints may vary depending on the approaches for identifying the skeleton structure of the entity. FIG. 2 shows an example skeleton representation 200 with fifteen identified joints for a human body in a frame. It is to be understood that with different actions occurring in different frames, the locations of those joints may be varied. In some other examples, locations of any other number of joints in a frame may be obtained.

A learning unit 116 included in the model building system 110 is configured to learn a model for action detection based on the skeleton representations and predefined action labels of the frames in the training dataset 112. A structure of the model may be constructed first. The model may be represented as one or more functions for mapping joint locations of a skeleton representation in a frame to a corresponding action label. The objective of the training process is to determine parameters of the model. Generally, a plurality of training frames and one or more predefined action labels for the frames may be used to train the model. A predefined action label may indicate which action occurs in a frame. In some implementations, the same predefined action label may be designated for the training frames. In some other implementations, multiple different predefined action labels may be designated for the training frames.

In some implementations, the trained model from the model building system 110 may be provided to the model executing system 120 for recognizing a predefined action from one or more incoming frames. Specifically, a representation extractor 124 receives an input frame 122 and extracts a skeleton representation of the frame. The skeleton representation may include joint locations of an observed entity in the frames. The joint locations may be provided to an executing unit 126 as an input to the trained model. An output of the model may indicate whether the frame is associated with any of the predefined action labels that have been used to train the model.

It would be appreciated that the systems 110 and 120 may be implemented in a single device according to an implementation or in multiple individual devices according to other implementations. Although the representation extractor 114 is shown as being included in the system 110 in FIG. 1, in some implementations, the representation extractor 114 may be separated from the system 110. The training frames may be processed by a remote representation extractor. The dataset 112 input to the model building system 110, for example, to the learning unit 116, may then include the extracted representation information of frames and corresponding predefined action labels. In some implementations, the representation extractor 124 may also be separated from the model executing system 120.

Figure 3A:
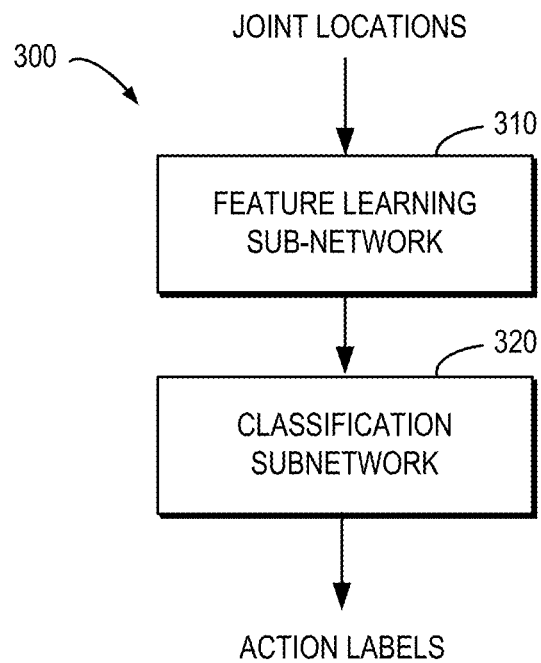
FIG. 3A illustrates a block diagram of a structure of a learning network.

The general concept of the environment 100 has been described above with reference to FIG. 1. In some conventional approaches for skeleton based action detection, a learning network is constructed as a model to detect actions from frames of a video. A typical learning network 300 is shown in FIG. 3A, which includes a feature learning sub-network 310 and a classification sub-network 320. The feature learning sub-network 310 is configured to extract features for a frame of a video based on joint locations of an entity in the frame and the classification sub-network 320 is configured to classify the frame based on the extracted features. A training process is applied to determine parameters for the feature learning sub-network 310 and the classification sub-network 320.

The feature learning sub-network 310 includes a plurality of elements (also referred to as neurons) to be trained to obtain the ability of extracting features from skeleton joints of training frames. The features may indicate correlations between the joints for different actions. The classification sub-network 320 includes one or more classification element each of which is trained to determine a probability of a frame being associated with one predefined action based on the extracted features.

Figure 3B:
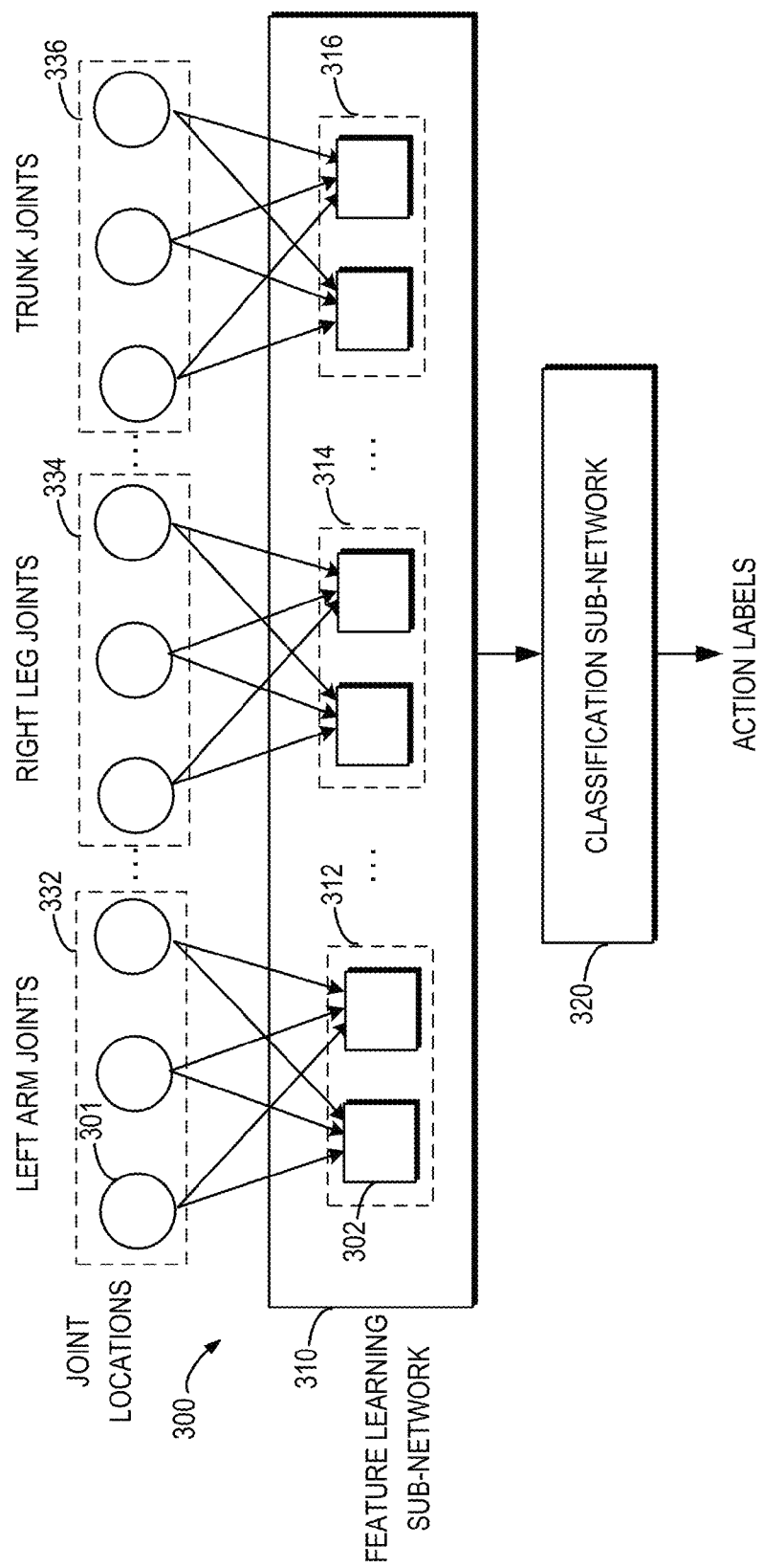
FIG. 3B illustrates a block diagram of a detailed structure of a conventional learning network.

In conventional approaches, neurons of the feature learning sub-network 310 are divided into a plurality of groups each of which is trained based on a subset of the skeleton joints. FIG. 3B shows a detailed diagram of such a learning network 300. As shown, joints 301 of a skeleton representation of an entity are divided into multiple groups including a group 332 consisting of three left arm joints 301, a group 334 consisting of three right arm joints 301, a group 335 consisting of three trunk joints 301, and other groups (not shown). According to the grouping of the joints, neurons 302 included the feature learning sub-network 310 are also divided into respective groups 312, 314, and 316 corresponding to the groups of joints 332, 334, and 336 respectively as well as other groups (not shown). Locations of the joints in the group 332 are input to each of the neurons in the group 312 to extract features for the joint group 332. Similarly, locations of the joints in the group 334 are input to each of the neurons the group 314 and locations of the joints in the group 336 are input to each of the neurons in the group 316 to extract features for the respective groups.

Although the grouping of the joints may be helpful to reduce the complexity and time consumption for determining the parameters for neurons in the feature learning sub-network 310, features learned by one of the groups of neurons can only reflect the correlation or dependency of a specific subset of the joints corresponding to this group but will not be correlated to other joints. Limitations of the correlations or dependencies of all the sub-networks may reduce the accuracy of the whole learning network. In addition, the grouping of the joints may depend on experiences of the technicians, which, however, may be far away from the actual correlation between the joints in the known actions.

In accordance with implementations of the subject matter described herein, a scheme for skeleton based action detection is proposed to provide end-to-end fully connected feature learning. A learning network including a feature learning sub-network and a classification sub-network is employed as a model for action detection. The feature learning sub-network includes a plurality of elements such as recurrent neural network (RNN) neurons for extracting features from joint locations of a skeleton representation for an observed entity or entities in a frame of a video. The joint locations in the frame are mapped by each of the RNN neurons in the learning network to a respective feature for the frame. In this way, without the fixed division of the joints, each of the RNN neurons may automatically learn correlations or dependencies of the joints from joint locations of multiple training frames during the training process, which may improve the accuracy of the learning network. The classification sub-network in the learning network is used to classify the frames into predefined action groups based on the features extracted by the feature learning sub-network.

Hereinafter, the terms "learning network," "learning model," "neural network," and "recurrent neural network" are used interchangeably. The terms "element" and "neuron" are used interchangeably. As used herein, the term "features" refers to information of dynamics of a frame which may indicate dependencies or correlations of some or all of the joints in the frame.

Figure 4:
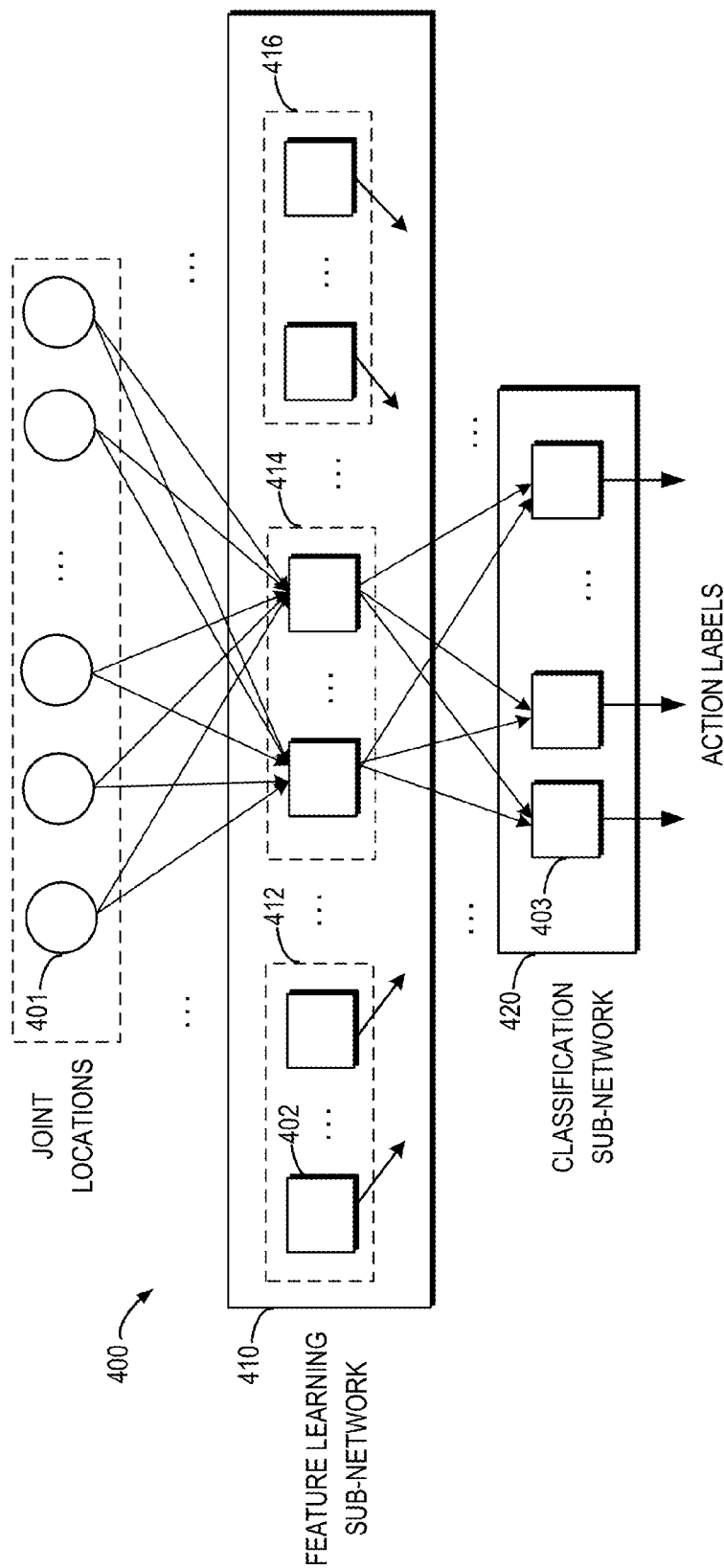
FIG. 4 illustrates a block diagram of a structure of a learning network in accordance with one implementation of the subject matter described herein.

FIG. 4 shows a schematic diagram of a learning network 400 according to an implementation of the subject matter described herein. The learning network 400 includes a feature learning sub-network 410 and a classification sub-network 420. The feature learning sub-network 410 includes a plurality of RNN neurons 402. Accordance with implementations of the subject matter described herein, each of the RNN neurons 402 is connected with all the input joint locations 401 of a frame. For the sake of brevity, the joint locations 401 are shown to be connected to only two neurons 402 explicitly in FIG. 4. A RNN neuron 402 maps the connected joint locations 402 to an output response, which is referred to as a feature for the input frame herein. The features obtained by the RNN neurons 402 of the feature learning sub-network 410 are then provided to the classification sub-network 420.

The classification sub-network 420 includes one or more classification neurons 403 each being connected to one or more of the features from the feature learning sub-network 410. The number of the RNN neurons may be set as any number larger than one, for example, 10, 100, 150, 200, or any other numbers. A classification neuron 403 generates a probability of the input frame being associated with a predefined action based on the connected features. The number of the classification neurons 403 may depend on the number of predefined actions used to train the learning network 400. Each of the classification neurons 403 may be dedicated for a specific predefined action.

To obtain the learning network 400 for action detection, joint locations for skeleton representations of an observed entity (or entities) in one or more training frames and the corresponding predefined action label(s) for the respective frames may be used to train the learning network 400 to determine the parameters for the neurons. Each of the training frames may be used to determine or optimize the parameters of the neurons in the learning network 400. To better understand which parameters for the neurons in the feature learning sub-network 410 and the classification sub-network 420 may be determined, the structure or processing within those neurons are first described below.

A RNN neuron has a self-connected recurrent connection in the time domain which is suitable for learning features from frames in a video over a period of time. Therefore, a number of RNN neurons may be employed in the feature learning sub-network 410. Depending on the use cases, a unidirectional RNN neuron (for example, a forward RNN neuron) and bidirectional RNN neurons including a forward RNN neuron and a backward RNN neuron may be used. A forward RNN neuron calculates an output response based on a skeleton representation of a frame in the current time slot (for example, joint locations of the current frame) and an output response of this neuron from a previous time slot. A backward RNN neuron calculates an output response based on a skeleton representation of a frame in the current time slot and an output response of this neuron from a future time slot. The output response of the forward or backward RNN neuron may be regarded as a feature for the frame.

For example, in the use case of on-line action detection, it is expected to detect whether a predefined action occurs in an incoming frame without waiting for the following frames, forward RNN neurons may be used in the feature learning sub-network because they only rely on knowledge at the current time slot and the previous time slots. In other use cases such as off-line action detection, a detecting result may be provided for a video slice with a plurality of frames. The learning network may be designed to detect whether there is a certain action occurs over the plurality of frames. Therefore, both forward and backward RNN neurons may be used in the feature learning sub-network because for a certain frame in the video slice, the knowledge prior to and after this frame is available for feature extraction.

In some implementations, the processing in forward RNN neurons included in the feature learning sub-network may be represented as follows:

$$h_t = \theta(W_{xh}x_t + W_{hh}h_{t-1} + b_h) \quad (1)$$

where $h_t$ represents the output responses (features) of the respective forward RNN neurons at a point of time t; $x_t$ represents the inputs of the forward RNN neurons and may consist of a plurality of joint locations for a frame at a point of time t; and $h_{t-1}$ represents the output responses of the forward RNN neurons at a previous point of time t−1. $W_{xh}$ represents a weight matrix for mapping the input $x_t$ to the output responses $h_t$. $W_{hh}$ represents a weight matrix for mapping the previous output responses $h_{t-1}$ to the current output responses $h_t$. $b_h$ represents a bias vector, and $\theta(\bullet)$ represents a non-linear function. The non-linear function may be a tangent function, a sine function, a sigmoid function, a rectified linear function or any other functions that can apply non-linearity to the input. The processing of backward RNN neurons is similar to that of the forward RNN neurons except that the output responses $h_{t-1}$ at a following point of time t+1 replace the previous output responses $h_{t-1}$. For the sake of brevity and clarity, the processing of the backward RNN neurons is omitted here.

Figure 5:
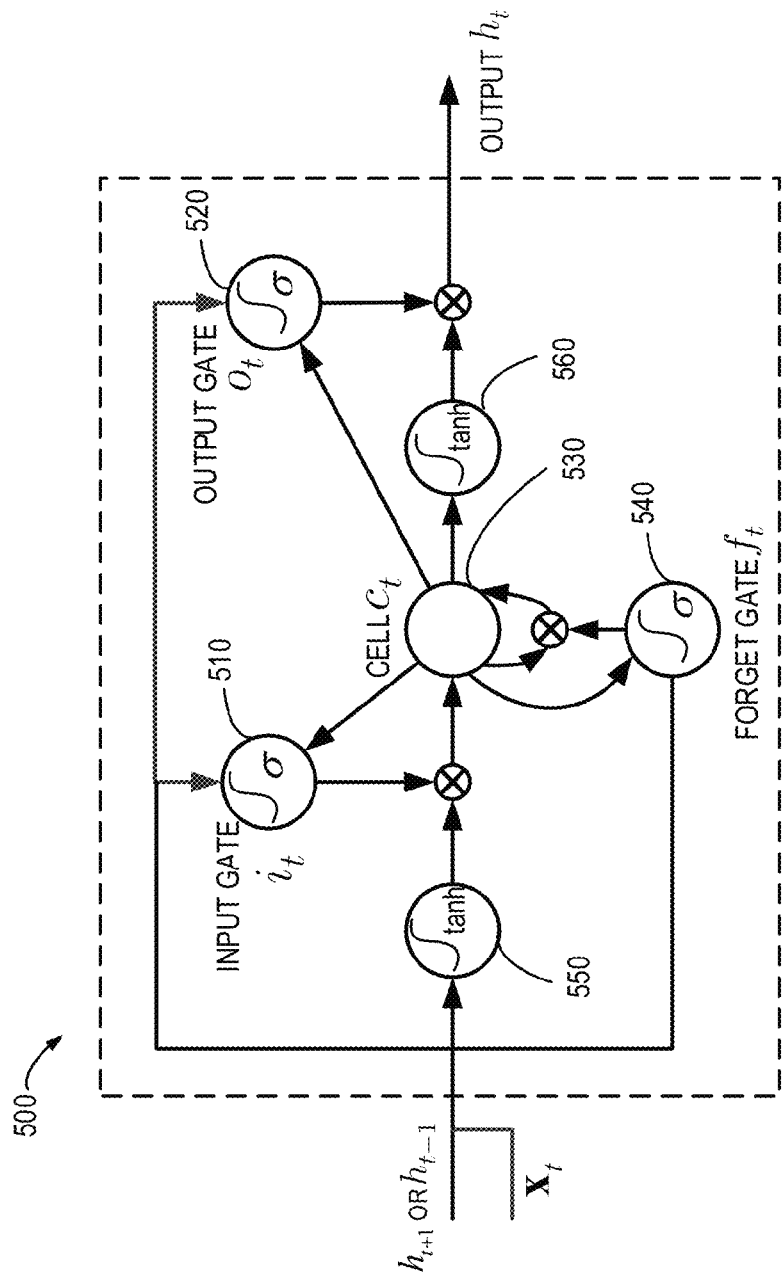
FIG. 5 a block diagram of a structure of a typical LSTM neuron in accordance with one implementation of the subject matter described herein.

In some implementations, the normal RNN neurons described above may suffer from vanishing gradient. To overcome this limitation, advanced RNN neurons, namely long short-term memory (LSTM) neurons, may be used instead. A structure of a typical LSTM neuron 500 is shown in FIG. 5. As shown, the LSTM neuron 500 includes an input gate 510, an output gate 520, a memory cell 530, a forget gate 540, and two non-linear cells 550 and 560. The input gate 510 and the forget gate 540 control the information flow into and out of the memory cell 530. The output gate 520 controls how much information from the memory cell 530 is passed to an output response $h_t$ of the LSTM neuron 500. The memory cell 530 has a self-connected recurrent edge of weight 1, ensuring that the gradient can pass across many time steps without vanishing or exploding. Therefore, this structure allows the LSTM neuron 500 to memorize and access information many time slots ago, overcoming the difficulties in training the neural network caused by the vanishing gradient effect.

Depending on whether an additional input is $h_{t-1}$ or $h_{t+1}$, the LSTM neuron 500 may be regarded as a forward neuron or a backward neuron. For a feature learning sub-network including a plurality of forward LSTM neurons 500, the recursive calculations of the units included in the forward LSTM neurons at a point of time t may be represented as follows:

$$i_t = \sigma(W_{xi}x_t + W_{hi}h_{t-1} + W_{ci}c_{t-1} + b_i), \quad (2)$$

$$f_t = \sigma(W_{xf}x_t + W_{hf}h_{t-1} + W_{cf}c_{t-1} + b_f), \quad (3)$$

$$c_t = f_t \odot c_{t-1} + i_t \odot \tan h(W_{xc}x_t + W_{hc}h_{t-1} + b_c), \quad (4)$$

$$o_t = \sigma(W_{xo}x_t + W_{ho}h_{t-1} + W_{co}c_t + b_o), \quad (5)$$

$$h_t = o_t \odot \tan h(c_t), \quad (6)$$

where $i_t$, $f_t$, $c_t$, $o_t$ represents a matrix with elements respectively corresponding to the output responses of the input gates 510, forget gate 540, memory cells 530, and output gates 520 in the LSTM neurons, respectively. $x_t$ represents the inputs of the LSTM neurons at a point of time t and $h_t$ represents the final output responses of the LSTM neurons at a point of time t. $W_{\alpha\beta}$ represents a weight matrix for $\alpha$ and $\beta$ with $\alpha \in \{x,h,c\}$ and $\beta \in \{i,f,c,o\}$. For example, $W_{xi}$ represents a weight matrix for mapping the inputs $x_t$ to the output responses of the input gates $i_t$. $b_\beta$ represents the bias vector of $\beta$ with $\beta \in \{i,f,c,o\}$. $\odot$ represents an element-wise product, and $\sigma(\alpha)$ represents a sigmoid function defined as $\sigma(\alpha)=1/(1+e^{-\alpha})$. It will be noted that the recursive computations in the LSTM neurons may be represented in other forms.

It would be appreciated that the calculations in the units of the backward LSTM neurons are similar to those of the forward LSTM neurons except that the output responses $h_{t-1}$ at a following point of time t+1 replace the previous output responses $h_{t-1}$. For the sake of brevity and clarity, the calculations in the backward LSTM neurons are omitted here. It would also be appreciated that in the following, the normal RNN neurons and the LSMT neurons are collectively referred to as "RNN" neurons.

A classification neuron in the classification sub-network 420 may determine a probability of a predefined action for an incoming frame in on-line action detection (or a sequence of frames in off-line action detection). That is, for the on-line action detection, the classification sub-network 420 may provide a detection result for each incoming frame, while for the off-line action detection, the classification sub-network 420 may determine a detection result by processing a sequence of frames. The determination in the classification sub-network 420 may be represented as follows:

$$o = \sum_{t=1}^{T}(W_{ho}h_t + b_o), \quad (7)$$

$$P(C_k \mid X) = \frac{e^{o_k}}{\sum_{i=1}^{C} e^{o_i}}, k = 1, \ldots, C \quad (8)$$

where C represents the number of predefined action labels, X represents the input frame(s), and T represents the number of frames in X. T may be one in the case of on-line action detection and may be larger than one in the case of off-line action detection. $h_t$ represents the output responses from the feature learning sub-network 410 at the point of time t, indicating the features learned from the input frame(s) X. $o=[o_1, o_2, \ldots, o_C]$ represents the output responses of the classification neurons in the classification sub-network 420, indicating probabilities of the respective predefined actions occurring in the input frame(s) X. $W_{ho}$ represents a weight matrix for mapping the features $h_t$ to the output responses o, and $b_o$ represents a bias vector.

Equation (8) may be used to normalize a probability $o_k$ in the output responses o obtained from Equation (7) into a range from 0 to 1. $P(C_k|X)$ represents a normalized probability of the input frame(s) X being associated with the kth predefined action label, where $P(C_k|X)=1$ means the presence of an action labeled by the kth action label in the frame(s) X and $P(C_k|X)=0$ means the absence of the action. In some implementations, one of the predefined action labels may be corresponding to a blank class, representing the situation where the input frame(s) X does not include any predefined action. It would be appreciated that the normalization shown in Equation (8) is merely for the purpose of illustration and the probabilities may be normalized in any other suitable manner.

From the above Equations (7) and (8), it can be seen that to model the classification sub-network 420, the undetermined parameters for the classification neuron(s) such as $W_{ho}$ and $b_o$ may be trained based on skeleton representations of multiple training frames and corresponding predefined action label(s) for the frames.

In addition, from the above Equations (1) to (6), it can be seen that to model the feature learning sub-network 410, the undetermined parameters for the RNN neurons (or the LSTM neurons) may also be trained based on skeleton representations of the training frames and corresponding predefined action labels for the frames. The undetermined parameters may include, for example, the weight matrices $W_{sh}$, $W_{hh}$, and probably the bias vector $b_h$ as shown in Equation (1) (or the weight matrices $W_{\alpha\beta}$ with $\alpha \in \{x,h,c\}$ and $\beta \in \{i,f,c,o\}$, and the bias vectors by with $\beta \in \{i,f,c,o\}$ as shown in Equations (2)-(6)). As mentioned above, all the inputs (for example, the joint locations) are connected to each of the neurons in the feature learning sub-network 410 so as to output a corresponding feature for an incoming frame. This may increase the parameter space with the number of the neurons fixed, especially increase the number of the weights in the weight matrices related to the input joint locations $x_t$, including $W_{sh}$ (for normal RNN neurons) or $W_{x\beta}$ with $\beta \in \{i,f,c,o\}$ (for LSTM neurons). On the other hand, it might be difficult to determine parameters for the RNN neurons to extract accurate features from the incoming frame when all the joint locations are connected to each of the neurons.

Figure 6:
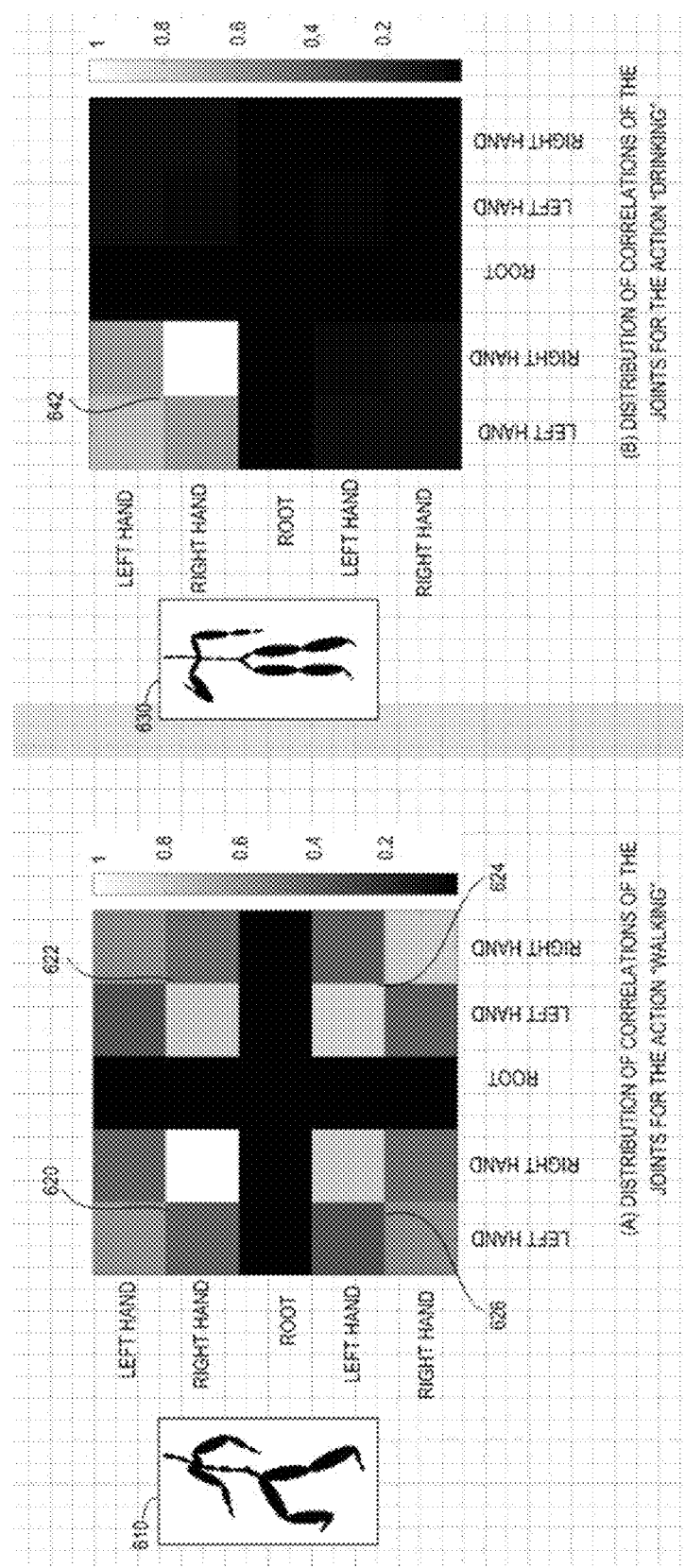
FIG. 6 illustrates schematic diagrams of distributions of correlations for different actions in accordance with another implementation of the subject matter described herein.

In order to effectively and accurately determine the weight parameters in the context of the inputs being fully connected to all the neurons, co-occurrence of some skeleton joints in predefined actions are considered. It is found that for a certain action, some of the joints may have relative large correlations with each other but have low correlations with other joints. FIG. 6 shows example distributions of correlations of the joints for an action of "walking" 610 and an action of "drinking" 630. Five joints from left and right hands, left and right feet, and the root are considered in the example of FIG. 6. The correlations between two joints among the five joints are indicated by the covariance matrix of the corresponding joint locations over a plurality of frames.

The distribution (A) for the action of "walking" 610 shows that the joints from the hands and the feet have relative large correlations as shown in areas 620-626 but exhibit low correlations with the joint of root. This means that the joints from the hands and the feet appear to be active (varied in a large range), which may also be referred to co-occurrence of those joints in an action. The distribution (B) for the action of "drinking" 630 shows a different pattern of correlations of joints from the action of "walking" where the joints from the hands have relative large correlations as shown in the area 642 but have low correlations with other joints. The correlations between the other joints are also shown as low.

It can be seen from the examples of FIG. 6 that a discriminative subset of active joints varies for different actions, and thus the co-occurrence of the subset of active joints can be used to characterize an action. It is expected that the RNN neurons in the feature learning sub-network 410 can explore co-occurrences of one or more different subsets of active joints for one or more predefined actions during the training process. In other words, it is expected that different RNN neurons in a group or RNN neurons in different groups may be trained to focus on learning features from one or more different subsets of skeleton joints.

The first and second weights may be any positive or negative values. In some examples, these weights may be normalized into a range of 0 to 1. In implementations of the subject matter described herein, when determining the weight matrix (or matrices) for mapping the input joint locations to features output by the RNN neurons during the training process, a first correlation between the first feature and a first subset of the joint locations and a second correlation between the second feature and the first subset of the joint locations may be increased. In some implementations, when a weight for mapping a joint location to a feature of a RNN neuron is large, it means that a correlation between the joint location and the feature is high. Therefore, absolute magnitudes of a subset of first weights for mapping a first subset of the joint locations to a first feature generated by a first RNN neuron and absolute magnitudes of a subset of second weights for mapping the same first subset of the joint locations to a second feature generated by a second RNN neuron may be trained to be large (for example, be closed to 1). A first (or second) weight for a joint location with a large (positive or negative) magnitude indicates that this joint location may have a high impact on the feature of the first (or second) RNN neuron. The first subset of the joint locations may include one or more joints. In this case, the first and second RNN neurons may be trained to focus on learning the first and second features that are highly correlated to the first subset of joint locations.

In some implementations, for the first and second RNN neurons, absolute magnitudes of weights corresponding to the remaining joint locations (those not included in the first subset) may be small (for example, be closed to 0) during the training process. In this case, the first and second features of the first and second RNN neurons may have a relatively low correlation to the remaining joint locations other than those in the first subset. Accordingly, the trained weight matrix (or matrices) for mapping the joint locations to the features output by the RNN neurons may be sparse, with absolute magnitudes of weights corresponding to the first subset of the joint locations being large while absolute magnitudes of other weights being small. By way of example, if training frames with an action of "drinking" (the action 630 in FIG. 6, for example) and a predefined action label for this action are used to train the RNN neurons in the feature learning sub-network 410, all the RNN neurons may be trained to have high absolute magnitudes of weights for mapping the hands joints and have low absolute magnitudes of weights for mapping other joints. It would be appreciated that which joints will be included in the first subset is not preconfigured, but is automatically trained based on the training data, for example, based on the predefined actions in the training frames.

In some implementations, for the weight matrix $W_{sh}$ in the case of normal RNN neurons, it is assumed that this matrix includes N rows corresponding to N neurons used in the feature learning sub-network 410 and J columns corresponding to the dimension of the inputs to the neurons. The weight matrix WA may be regarded as a series combination of the weights for the N neurons. In some implementations, J may be the number of the skeleton joints multiplied the number of values used to represent the joint locations (2 in the case of 2D locations or 3 in the case of 3D locations, for example). To focus some of the N neurons on extracting features from a subset of the skeleton joints, the weight matrix $W_{sh}$ may be trained to have larger weights in some of the columns corresponding to the subset of skeleton joints and smaller weight in other columns. Similarly, in the case of LSTM neurons, one or more of the weight matrices $W_{x\beta}$ with $\beta \in \{i,f,c,o\}$ may be trained to have larger weights in some but not all columns.

In addition, the weight matrix related to the input joint locations may be trained to focus some of the RNN neurons on extracting features from a first subset of the skeleton joints while some other RNN neurons on extracting features from a different second subset of the skeleton joints. To achieve this, the RNN neurons in the feature learning sub-network 410 may be divided into different groups as shown in FIG. 4 for illustration. The number of the groups may be predetermined. In some implementations, the RNN neurons may be equally divided into the predetermined number of groups and thus each of the groups includes the same number of neurons. In some other implementations, the number of RNN neurons in the respective groups may necessarily not be the same.

In the example shown in FIG. 4, the RNN neurons 402 in the feature learning sub-network 410 are grouped into three groups 412, 414, and 416. It would be appreciated that the grouping shown in FIG. 4 is merely for illustration, and the RNN neurons 402 may be divided into two groups, four or more groups, or may not be divided as described above. Different groups of RNN neurons may focus on different subsets of skeleton joints, with the weights for the respective subsets of the input joint locations being trained to be large while other weights to be small. Thus, features extracted by RNN neurons in a different group may be highly correlated to a different subset of the joint locations. In some examples, different subsets of skeleton joints may include one or more but not all identical joints.

In the example of the weight matrix $W_{sh}$, it may include K sub-matrices $W_{xh}=[W_{xh,1}; W_{xh,2} \ldots ; W_{xh,K}]$ (K=3 in the example of FIG. 4) each corresponding to one of the divided groups. Each weight sub-matrix $W_{sh,k}$ may have the number of its rows equal to the number of neurons included in the corresponding group and the number of its columns equal to the number of the dimension of the inputs. During the training process, the training data may be used to train a sub-matrix $W_{sh,k}$ to have large absolute magnitudes of weights in some of its columns corresponding to a subset of skeleton joints and to train a different sub-matrix $W_{sh,k}$ to have large absolute magnitudes of weights in some other columns corresponding to a different subset of skeleton joints. In the case of LSTM neurons, one or more of the weight matrices $W_{x\beta}$ with $\beta \in \{i,f,c,o\}$ may be trained in a similar manner.

In some implementations, the sparsity of the weight matrix (or matrices) may be obtained based on a $L_{2,1}$ norm, which may be discussed in detail below. In addition, to prevent the values of the weights for the joint locations from being too large and further improve the sparsity of the weight matrix (or matrices), the sum of the absolute magnitudes of these individual weights in the weight matrix (matrices) may be restrained. In one example, the sum of the absolute magnitudes may be represented as a $L_1$ norm. The training process is to reduce the $L_1$ norm, which may also be discussed in detail below.

Generally, the training process is to use an objective function to determine the parameters for the neurons in the learning network 400 based on the training data such as the joint locations of training frames as well as predefined action labels for the frames. In some implementations, the objective function is to reduce or minimize the maximum likelihood loss function as follows:

$$\min_{W_{x\beta}} \left( L + \lambda_1 \sum_{\beta \in S} \|W_{x\beta}\|_1 + \lambda_2 \sum_{\beta \in S} \sum_{k=1}^{K} \|W_{x\beta,k}^T\|_{2,1} \right) \quad (9)$$

where L represents the maximum likelihood loss function related to the classification sub-network 420 which may be described later. $W_{x\beta} = [W_{x\beta,1}; W_{x\beta,2} \ldots; W_{x\beta,K}]$ represents a weight matrix for mapping the input joint locations to the output responses of the neurons in the feature learning sub-network 410, with $\beta = h$ in the case of RNN neurons and $\beta \in \{i,f,c,o\}$ in the case of LSTM neurons. K represents the number of the divided groups of the neurons in the feature learning sub-network 410, which may be larger than or equal to 1. $W_{x\beta,k}^T$ with a superscript T represents a transpose of the sub-matrix $W_{x\beta,k}$. The term $\|W_{x\beta,k}^T\|_1$ represents a $L_1$ norm of the weight matrix $W_{x\beta}$. The term $\|W_{x\beta,k}^T\|_{2,1}$ represents a $L_{2,1}$ norm of the sub-matrix $W_{x\beta,k}$. $\lambda_1$ and $\lambda_2$ represents the weighting values for the $L_1$ norm and $L_{2,1}$ norm, respectively. $\lambda_1$ and $\lambda_2$ may be preconfigured to, for example, any values in the range from 0 to 1.

The $L_1$ norm $\|W_{x\beta}\|_1$ may be a sum of the absolute magnitudes of the individual weights in the matrix $W_{x\beta}$. The objective of the training process is to reduce or minimize this sum so that the absolute magnitudes of weights may be not too large and the weights in this matrix can be sparse. A $L_{2,1}$ norm of a matrix W with N rows and M columns may be defined as $$\|W\|_{2,1} = \sum_{i=1}^{N} \sqrt{\sum_{j=1}^{M} w_{i,j}^2}.$$

Reducing or minimizing the $L_{2,1}$ norm of the transpose sub-matrix $W_{x\beta,k}^T$ may enable the sub-matrix $W_{x\beta,k}$ to be column sparse with absolute magnitudes of weights in one or more columns being relative large while others being small. Thus the RNN neurons corresponding to a sub-matrix $W_{x\beta,k}$ may be able to learn features that are highly correlated to a subset of skeleton joints. Minimizing the $L_{2,1}$ norms of different sub-matrices $W_{x\beta,k}$ may enable the RNN neurons to acquire the capability of recognizing multiple types of actions due to the different co-occurrences of skeleton joints. In some implementations, the objective of the training process may be set as to reduce or minimize a sum of the $L_{2,1}$ norms of all the sub-matrices $W_{x\beta,k}$ with $\beta \in \{i,f,c,o\}$.

As mentioned, the maximum likelihood loss function L is related to the classification sub-network 420. In the training process, it is expected that the output responses of the classification neurons (the probabilities) can be trained to provide accurate probabilities for the input frames. Specifically, for a training frame being labeled to the kth action label, the classification neurons may be trained to provide a higher probability of the frame being associated with the kth action label (for example, a probability closed or equal to 1) and low probabilities of the frame being associated with any other action label. The maximum likelihood loss function L may be represented as follows:

$$L = -\ln \sum_{i=1}^{C} z_{t,k} P(C_k | X) \quad (10)$$

where C represents the number of predefined action labels and may be larger than or equal to one, and $P(C_k|X)$ represents a probability generated by the classification sub-network 420 indicating the confidence of the input frame(s) X being associated with the kth predefined action label. $z_{t,k}$ represents the predefined action label for the input frame(s) X at the point of time t (the ground truth). If the action corresponding to the kth predefined action label occurs in the input frame(s) X, $z_{t,k}$ may be set to 1; otherwise, $z_{t,k}$ may be set to 0. It is expected to train the classification neurons to provide the probability $P(C_k|X)$ closed to the ground truth $z_{t,k}$. It can be seen from Equation (10) that if the maximum likelihood loss function L is made to be reduced, $P(C_k|X)$ become closed to the truth $z_{t,k}$.

During the training process, the undetermined weights or parameters for the neurons in the sub-networks 410 and 420 may first preconfigured with random values. By inputting the joint locations of a training frame (or a sequence of training frame in off-line action detection), the preconfigured weights or parameters may be updated by reducing or minimizing the objective function as shown in Equation (9) during the training process. The term $\|W_{x\beta,k}^T\|_{2,1}$ in the objective function may ensure the weight matrix (matrices) $W_{x\beta,k}$ to be column sparse as discussed above, and the term $\|W_{x\beta}\|_1$ may restrain the absolute magnitudes of the weights from being too large. The restraining term L may ensure the output probabilities of the classification elements being the same for the ground truths by updating the parameters required in all the neurons of the learning network 400 which may include $W_{hh}$, $W_{\alpha\beta}$ with $\alpha \in \{x,h,c\}$ and $\beta \in \{i,f,c,o\}$, $W_{ho}$, and/or the bias vectors involved in the neurons. In some examples, when bidirectional RNN or LSTM neurons are used, the weight matrices or parameters for both the forward and backward neurons may be determined in a similar way.

Figure 7:
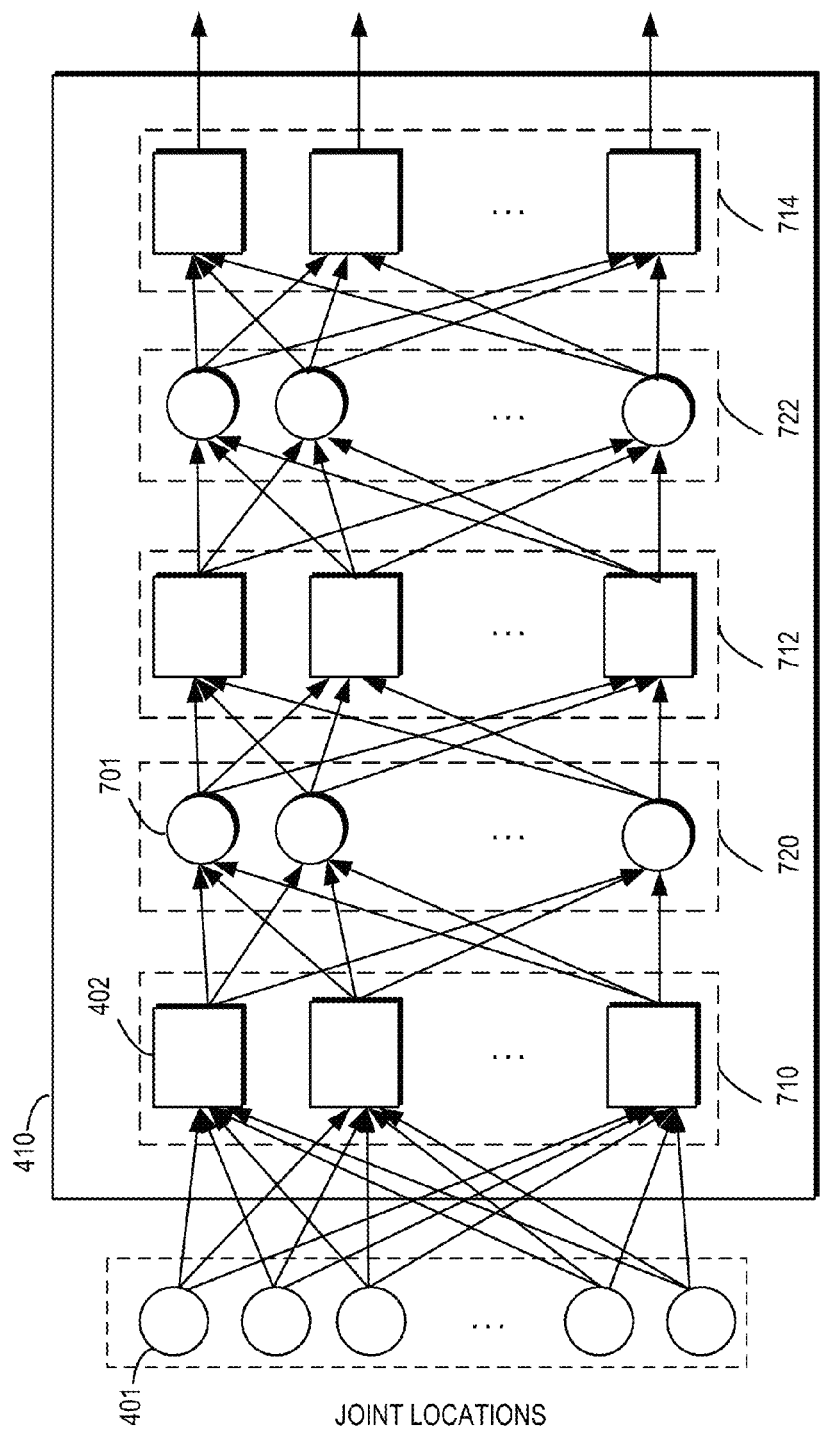
FIG. 7 illustrates a block diagram of a structure of a part of the learning network in accordance with one implementation of the subject matter described herein.

In the discussion above, the feature learning sub-network 410 is shown to be a single layer. In some implementations, to increase the depth of the feature learning, the feature learning sub-network 410 may be a multi-layered sub-network including one or more additional layer of RNN neurons as those shown in FIG. 4. In some examples, for higher accuracy of the feature learning, a feature fusion layer may be arranged between every two RNN layers. FIG. 7 shows an example of the multi-layer feature learning sub-network 410 according to an implementation of the subject matter described herein.

As shown, the feature learning sub-network 410 includes three RNN layers 712, 714, and 716 each consisting of a plurality of RNN neurons. The number of RRN neurons including in each of the layer may be the same or different. A feature fusion layer 722 is arranged between the RNN layers 712 and 714 while another feature fusion layer 724 is arranged between the RNN layers 716 and 718. The feature fusion layers 722, 724 include one or more neurons for applying non-linearity to the output responses from the previous layer.

In the multi-layer structure, the inputs of the first layer, for example, the RNN layer 712 receives joint locations of a frame and generates corresponding features to be provided to the upper layer, for example the feature fusion layer 722. The feature fusion layer 722 may continue to perform feature fusion on the features received from the previous layer and provide the processed features to the next upper layer. The output responses of the last layer, for example, the RNN layer 716 may be provided to the classification sub-network 420. The output responses generated by the layers prior to the last layer may also be referred to as features for the frame, while the output responses of the last layer may be referred to the resulting features for this frame. It would be appreciated that in these implementations, the classification neurons in the classification sub-network 420 may also consist of a layer, which may be the upper layer for the last layer 714 in the feature learning sub-network 410.

In some implementations, each of the neurons in a feature fusion layer may receive all the output features from the previous RNN layer and perform feature fusion on the received features. In some examples, the processing in non-linear neurons in the feature fusion layer may be represented as follows:

$$g_t = \theta(W_{hg} h_t + b_g) \quad (11)$$

where $g_t$ represents the output responses of a feature fusion layer at a point of time t, $h_t$ represents the inputs of the feature fusion layer at the point of time t (for example, the output responses from the previous RNN layer), $W_{hg}$ represents a weight matrix for mapping the inputs $h_t$ to the output responses $g_t$, $b_g$ represents a bias vector, and $\theta(\cdot)$ represents a non-linear function. The non-linear function may be a tangent function, a sine function, a sigmoid function, a rectified linear function, or any other functions that can apply non-linearity to the inputs.

In some implementations, the output responses from a feature fusion layer may be provided to each of the RNN (LSTM) neurons in the upper RNN layer. In some implementations, each of the RNN layers may be divided into more than one group (for example, K groups) with each group to focus on a different subset of the skeleton joints during the training process, as discussed above with reference to FIG. 4. Alternatively, the RNN neurons in one or more of the layers may focus on only one subset of the skeleton joints.

In the implementations of the multi-layer feature learning sub-network, the processing of the RNN neurons in an upper layer may be similar as that shown in Equation (1) or Equations (2)-(6) except that the inputs $x_t$ are replaced with the output responses from the previous layer. In some implementations, all the $L_{2,1}$ and $L_1$ norms for restraining the weight matrices for the inputs of the RNN neurons in the respective layers (the input joint locations for the first RNN layer or the output responses for the other RNN layers) may be added into the objective function for the learning network 400. During the training process, by minimizing that objective function, the parameters for the neurons included in the learning network, including parameters for the neurons in the feature fusion layer may be determined.

It would be appreciated that the structure of the multi-layer feature learning sub-network 410 in FIG. 7 is shown only for the purpose of illustration and any other suitable structure may be applied. In some implementations, the feature learning sub-network 410 may be designed to include a different number of layers. In some implementations, the RNN layers and feature fusion layers are not necessarily be arranged in an alternate way as in FIG. 7 and there may be two or more consecutive RNN layers or feature fusion layer. In these implementations, the output responses from a RNN layer (or a feature fusion layer) may be provided to the next RNN layer (or the next feature fusion layer). In some implementations, the last layer of the feature learning sub-network 410 may be a feature fusion layer instead of a RNN layer as in FIG. 7.

With the objective function, in some implementations, the weights or parameters for the feature learning sub-network 410 and the classification sub-network 420 may be determined based on the training dataset including joint locations for skeleton joints of multiple frames and corresponding predefined action labels. In some implementations, training methods such as alternating least square (ALS), stochastic gradient descent (SGD), or limited-memory BFGS (Broyden, Fletcher, Goldfarb, and Shanno) may be employed to train the learning network 400. Additionally, a Back Propagation Through Time (BPTT) method may be used to update the undetermined weights or parameters.

During the training process, in order to improve the performance of the neurons in the learning network 400, a dropout strategy may be applied. Generally, the same training dataset including training frames and predefined action labels may be used to train the learning network 400 for multiple times of iteration to obtain optimal parameters and/or weights for the neurons. Based on the dropout strategy, in each time of iteration, some of the neurons may be randomly selected to be masked while only the parameters and/or weights for the unmasked neurons are updated in this iteration. For example, some of the neurons in each of the layers in the feature learning sub-network 410 and/or the classification sub-network 420 may be masked. In different iterations, different neurons in the feature learning sub-network 410 and/or the classification sub-network 420 may be masked. As used herein, "masking" a neuron or a unit means setting the output response of this neuron or unit as 0.

In some implementations where LSTM neurons are employed, some of the internal units included in respective LSTM neurons may be selected to be masked. Specifically, one or more of the input gate, output gate, memory cell, and forget cell included in a LSTM neuron may be selected to be masked. As can be seen from the above Equations (2)-(6), a LSTM neuron generates an output response based on the inputs as well as an output response of this neuron in a previous time slot (in the case of a forward LSTM neuron) or an output response in a following time slot (in the case of a backward LSTM neuron) because of the self-connected recurrent connection in the time domain.

Therefore, the output responses $h_t$ of LSTM neurons in a layer of the feature learning sub-network 410 at the point of time t may not only be provided to the upper layer but also be used by these LSTM neurons at a following point of time t+1 (in the case of a forward LSTM neurons) or at a previous point of time t−1 (in the case of backward LSTM neurons). If one of the internal cells in a LSTM neuron is masked in one of the iterations, the information from this unit may be erased, and the parameters related to this unit may not be updated in a same speed as that of the other units, which are not expected.

Figure 8:
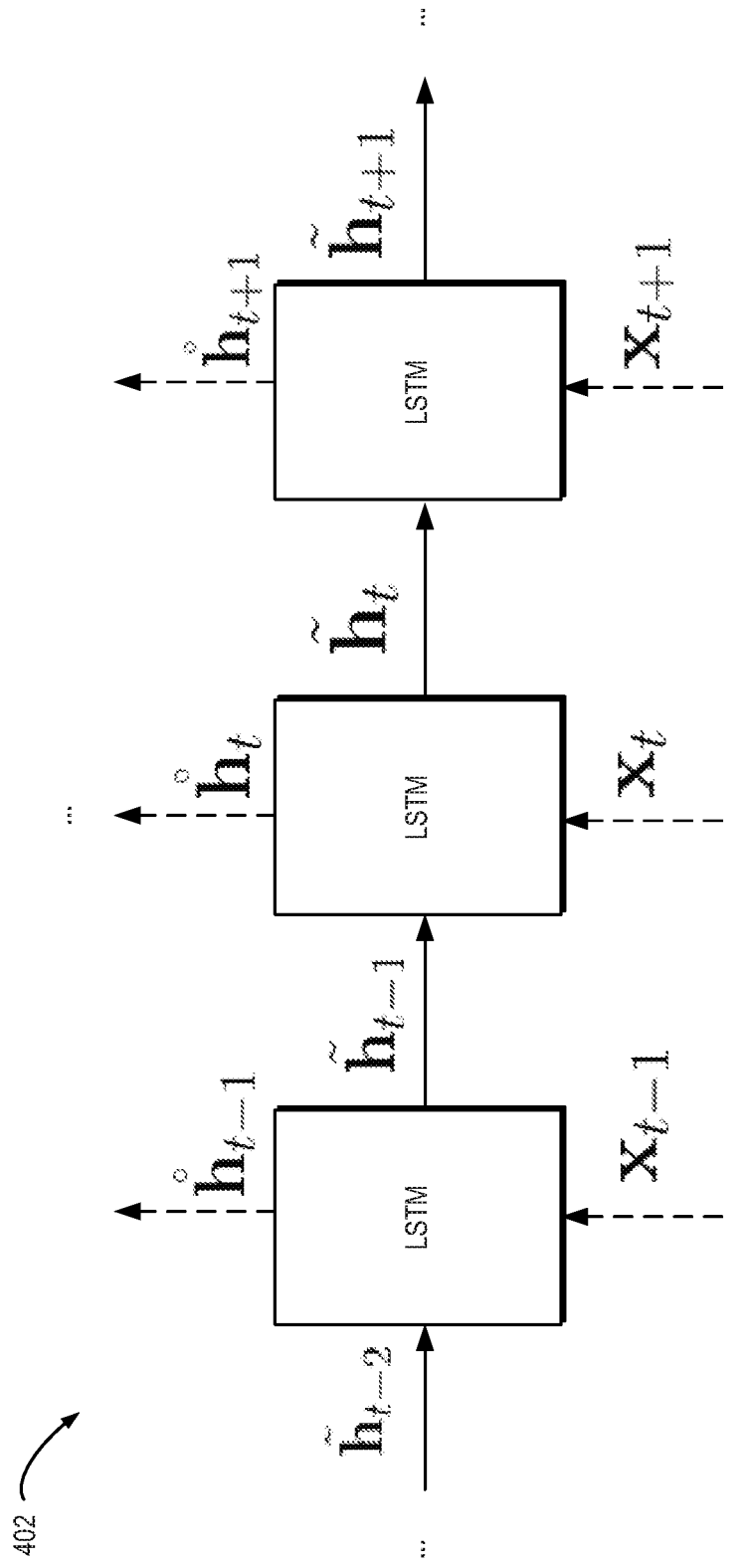
FIG. 8 illustrates a schematic diagram of an unfolded LSTM neuron in time domain in accordance with one implementation of the subject matter described herein.

A forward LSTM neuron, for example, a forward LSTM neuron 402 that may be used in a layer of the feature learning sub-network 410 is unfolded in the time domain as shown in FIG. 8. It would be appreciated that although implementations related to the forward LSTM neuron are discussed below, the implementations related to the backward LSTM neuron are similar to the implementations of the forward LSTM neurons and may be likewise obtained if the backward LSTM neuron is employed in the learning network 400.

In FIG. 8, $x_t$ represents the inputs (for example, the joint locations in the first layer or the output responses from the previous layer) to the LSTM neuron 402 at the point of time 1. Similarly, $x_{t−1}$ and $x_{t+1}$ represent the inputs to this LSTM 402 at a previous point of time t−1 and a following point of time t+1, respectively. $\mathring{h}_t$ represents the output response of the LSTM neuron 402 at the point of time t which is provided to the upper layer in the feature learning sub-network 410. $\mathring{h}_{t−1}$ and $\mathring{h}_{t+1}$ are defined as a similar way to $\mathring{h}_t$. $\tilde{h}_t$ represents the output response of the LSTM neuron 402 at the point of time t which will be processed by this neuron at the following point of time t+1. $\tilde{h}_{t−2}$, $\tilde{h}_{t−1}$, and $\tilde{h}_{t+1}$ are defined as a similar way to $\tilde{h}_t$.

In some implementations, the processing of the internal units of the LSTM neurons in the horizontal direction along the time domain may not be masked so that information across various time slots in all the units may not be erased. Therefore, the output responses of the internal units as well as the output responses of the LSTM neurons in a layer of the feature learning sub-network 410 that are to be processed by the LSTM neurons at the following point of time may be represented as follows:

$$\tilde{i}_t = \sigma(W_{xi}x_t + W_{hi}\tilde{h}_{t−1} + W_{ci}\tilde{c}_{t−1} + b_i),$$

$$\tilde{f}_t = \sigma(W_{xf}x_t + W_{hf}\tilde{h}_{t−1} + W_{cf}\tilde{c}_{t−1} + b_f),$$

$$\tilde{c}_t = \tilde{f}_t \odot \tilde{c}_{t−1} + \tilde{i}_t \odot \tan h(W_{xc}x_t + W_{hc}\tilde{h}_{t−1} + b_c),$$

$$\tilde{o}_t = \sigma(W_{xo}x_t + W_{ho}\tilde{h}_{t−1} + W_{co}\tilde{c}_t + b_o),$$

$$\tilde{h}_t = \tilde{o}_t \odot \tan h(\tilde{c}_t). \qquad (12)$$

The definitions of the notations in Equation (12) are similar to those mentioned with reference to Equations (2) to (6). In Equation (12), 1, may be the joint locations if the concerned LSTM neurons are arranged in the first layer or may be the output responses from the previous layer if the concerned LSTM neurons are arranged in an upper layer. During the training process, the output responses of the input gates $\tilde{i}_t$, forget gates $\tilde{f}_t$, memory cells $\tilde{c}_t$, output gates $\tilde{o}_t$, and final outputs of the LSTM neurons $\tilde{h}_t$ are not masked.

In some other implementations, some of the internal units of the LSTM neurons in the vertical direction across layers of the feature learning sub-network 410 may be selected to be masked, which may be presented as follows:

$$\mathring{i}_t = \sigma(W_{xi}x_t + W_{hi}\tilde{h}_{t−1} + W_{ci}\tilde{c}_{t−1} + b_i) \odot m_i,$$

$$\mathring{f}_t = \sigma(W_{xf}x_t + W_{hf}\tilde{h}_{t−1} + W_{cf}\tilde{c}_{t−1} + b_f) \odot m_f,$$

$$\mathring{c}_t = \mathring{f}_t \odot \tilde{c}_{t−1} + \mathring{i}_t \odot \tan h(W_{xc}x_t + W_{hc}\tilde{h}_{t−1} + b_c) \odot m_c,$$

$$\mathring{o}_t = \sigma(W_{xo}x_t + W_{ho}\tilde{h}_{t−1} + W_{co}\mathring{c}_t + b_o) \odot m_o,$$

$$\mathring{h}_t = \mathring{o}_t \odot \tan h(\mathring{c}_t) \odot m_h, \qquad (12)$$

In Equation (13), $m_i$, $m_f$, $m_c$, $m_o$, and $m_h$ represent mask vectors for output responses of the input gates $\mathring{i}_t$, forget gates $\mathring{f}_t$, memory cells $\mathring{c}_t$, output gates $\mathring{o}_t$ and final outputs of the LSTM neurons $\mathring{h}_t$. The definitions of other notations in Equation (13) are similar to those mentioned with reference to Equations (2) to (6). In Equation (13), $x_t$ may be the joint locations if the concerned LSTM neurons are arranged in the first layer or may be the output responses from the previous layer if the concerned LSTM neurons are arranged in an upper layer. The mask vectors may include respective binary values for output responses of the input gates, forget gates, memory cells, output gates, and final outputs of corresponding LSTM neurons. A value of 0 indicates that the corresponding output response is masked while a value of 1 indicates that the output response is not masked.

It would be appreciated that the $m_i$, $m_f$, $m_c$, $m_o$, and $m_h$ may be the same or different from each other. Those masking vectors may be changed in different times of iteration so as to randomly select different output responses (different corresponding internal units) for masking. In some implementations, some of those masking vectors may be set with all the elements equal to 1, which means that all of output responses of the corresponding units or neurons are not masked. In some implementations, the selecting of output responses to be masked may be based on a predefined proportion p. For example, the proportion of masking may be set to 0.2, 0.3, 0.5, 0.7, or any other values within 1. In each time of iteration, the predefined portion of units or neurons may be randomly selected from all the units or neurons for masking their output responses.

In some implementations, an output response of an internal unit in a LSTM neuron may also be regarded as an intermediate feature learned by this unit. In these implementations, the weights for a LSTM neuron may include intermediate weights for mapping the inputs to the intermediate features for the internal units such as $W_{x\beta}$ with $\beta \in \{i,f,c,o\}$, as well as other intermediate weights required for the internal units such as $W_{\alpha\beta}$ with $\alpha \in \{h,c\}$ and $\beta \in \{i,f,c,o\}$. When some units of one or more LSTM neurons in a layer are masked in each time of iterations during the training process, as can be seen from Equation (13), the training dataset may be only used to update the weights for the internal units that are not masked. In other words, when some of the units are masked, intermediate weights for mapping the inputs (the joint location in the first layer or the output responses of the previous layer in an upper layer) to the intermediate features of the unmasked units may be updated while weights for the masked units remain unchanged. By randomly selecting different units to be masked in each time of iterations, the weights for all the internal units in the LSTM neurons may be determined.

In some implementations where a Back Propagation Through Time (BPTT) method is used to train the learning network, based on each of the training frames (or a training video slice), errors for the output responses of the neurons in the learning network may be determined and used to update the weights or parameters for the neurons. In some examples, errors for the output responses of the LSTM neurons in a layer may be represented as below:

$$\in_h^t = \overset{\circ}{\in}_h^t + \tilde{\in}_h^t, \quad (14)$$

where $\in_h^t$ represents errors determined for the output responses $h_t$ of the LSTM neurons at the point of time t, $\overset{\circ}{\in}_h^t$ represents errors determined for the output responses $\overset{\circ}{h}_t$ to be provided to an upper layer, and $\tilde{\in}_h^t$ represents errors determined for the output responses $\tilde{h}_t$ to be processed by the LSTM neurons in the following time slot. $\overset{\circ}{\in}_h^t$ and $\tilde{\in}_h^t$ may be determined as follows:

$$\overset{\circ}{\in}_h^t = \in_h^{hier} \odot m_h, \tilde{\in}_h^t = \in_h^{recur}, \quad (15)$$

where $\in_h^{hier}$ represents errors back-propagated from the upper layer at the point of time t, $\in_h^{recur}$ represents errors back-propagated from the next point of time t+1 in the same layer, and $m_h$ represents the masking vector used for masking the output responses $\overset{\circ}{h}_t$. $\odot$ represents an element-wise product.

In some implementations, the masking vectors for the output gates, the memory cells, the forget gates, and the input gates may also have impact on the errors back-propagated to update the weights or parameters of these units. For example, the errors from the $\overset{\circ}{h}_t$ may be back-propagated to the output responses of the output gates in the LSTM neurons based on Equation (13), which may be represented as follows:

$$\overset{\circ}{\epsilon}_o^t = \left( \overset{\circ}{\epsilon}_h^t \odot \frac{\partial \overset{\circ}{h}_t}{\partial \overset{\circ}{o}_t} \right) \odot m_o = \overset{\circ}{\epsilon}_h^t \odot \tanh(\overset{\circ}{c}_t) \odot m_o. \quad (15)$$

where $\overset{\circ}{\epsilon}_o^t$ represents the errors for the output gates that are back-propagated from the higher layer at the point of time t. Similarly, the errors $\tilde{\in}_o^t$ for the output gates that from the next point of time t+1 in the same layer may be represented as follows:

$$\tilde{\epsilon}_o^t = \tilde{\epsilon}_h^t \odot \frac{\partial \tilde{h}_t}{\partial \tilde{o}_t} = \tilde{\epsilon}_h^t \odot \tanh(\tilde{c}_t). \quad (16)$$

Therefore, the errors $\in_o^t$ back-propagated to the output gates may be a sum of $\overset{\circ}{\epsilon}_o^t$ and $\tilde{\in}_o^t$. The errors $\in_o^t$ may be used to update the weight or parameters related to the output gates. The errors back-propagated to the memory cells, the forget gates, and the input gates may be determined in a similar way based on Equation (13).

It would be appreciated that the learning network or neural network discussed above are available in a variety of architectures and can be implemented in hardware, software or a combination of hardware and software. In some implementations, the learning network may be trained in the learning unit 116 in FIG. 1 with the joint locations for the training frames from the representation extractor 114 and the corresponding predefined labels in the training dataset 112. In some implementations, the structure and the weights and/or parameters of the elements in the learning networks may be provided to the executing unit 126. The executing unit 126 may perform action detection for incoming frames based on the structure and the parameters of the elements in the learning network. Joint locations of an input (for example, an incoming frame in the case of on-line detection or a video slice with multiple frames in the case of off-line detection) may be provided by the representation extractor 124 and provided to the executing unit 126 for detecting whether a predefined action occurs.

In some implementations, based on the structure of the learning network shown in FIG. 4, joint locations for the incoming frame(s) may be obtained and provided to each of the RNN neurons included in the feature learning sub-network 410. Features for the input frame(s) may be generated by the RNN neurons with the trained weights and parameters. The generation of the features may be performed based on Equation (1) if normal RNN neurons are used or based on Equations (2)-(6) if LSTM neurons are used. The output responses of the neurons $h_t$ may be regarded as the features extracted for the input frame(s). Based on the learning network with a different structure as shown in FIG. 7, the output responses of each of the layers may be calculated by the neurons in this layer with the trained weights and parameters and provided to the upper layer. The output responses of the last layer may be regarded as the extracted features.

The features extracted by the feature learning sub-network 410 may be provided to the classification sub-network 420. Probabilities of the input frame(s) being associated with any of the predefined action labels may be determined by the classification neurons with the trained weights and parameters. The determination of the probabilities may be performed based on Equations (7) and (8).

In some implementations, when a dropout strategy is applied in the training process and some of the neurons or units in the neurons of the feature learning sub-network 410 are masked in each time of iteration based on a predefined proportion p, the weights of those neuron in the sub-network 410 may be first multiplied by the proportion (1−p) and then used to calculate the corresponding output responses.

Figure 9:
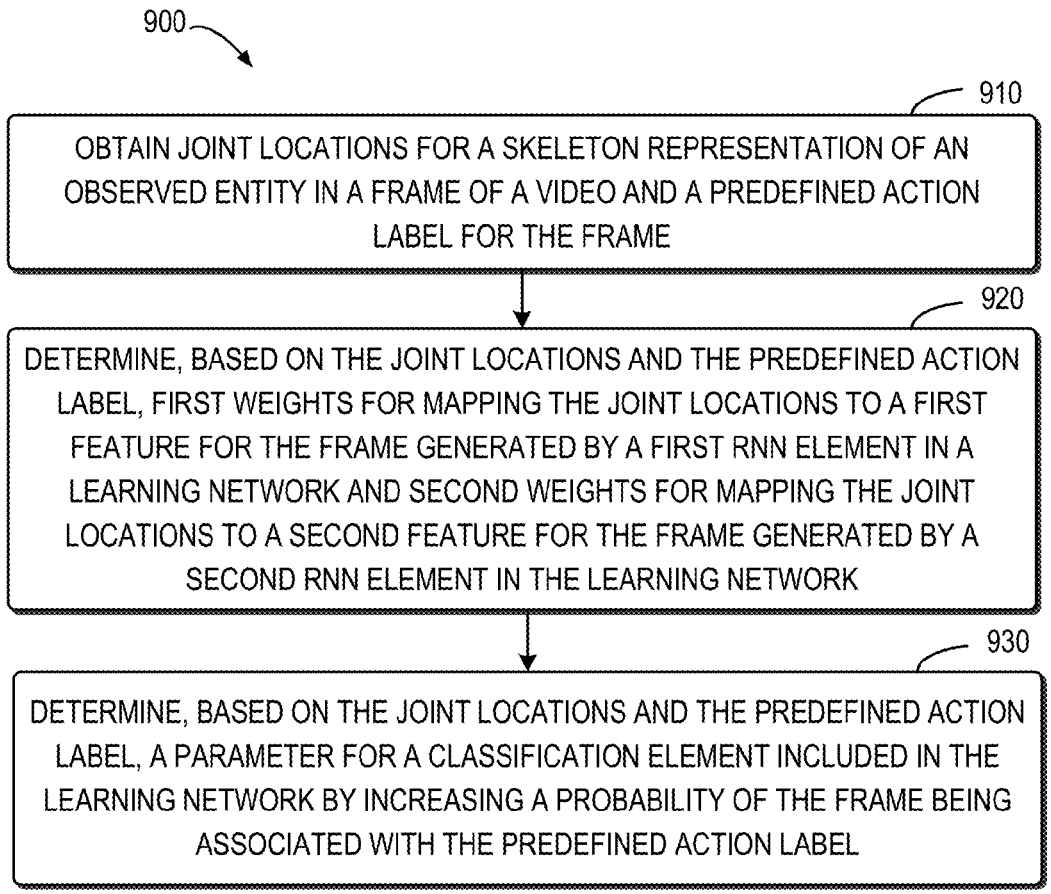
FIG. 9 illustrates a flowchart of a method of action detection in accordance with one implementation of the subject matter described herein.

FIG. 9 shows a flowchart of a method of action detection 900 in accordance with one implementation of the subject matter described herein. The method 900 may be implemented by the learning unit 116 in FIG. 1 to train a learning network for action detection. As shown, in step 910, joint locations for a skeleton representation of an observed entity in a frame of a video and a predefined action label for the frame are obtained.

In step 920, first weights for mapping the joint locations to a first feature for the frame generated by a first recurrent neural network (RNN) element in a learning network and second weights for mapping the joint locations to a second feature for the frame generated by a second RNN element in the learning network are determined based on the joint locations and the predefined action label by a first correlation between the first feature and a first subset of the joint locations and a second correlation between the second feature and the first subset of the joint locations. Then in step 930, a parameter for a classification element included in the learning network are determined based on the joint locations and the predefined action label by increasing a probability of the frame being associated with the predefined action label. The probability is generated by the classification element at least based on the first and second features.

In some implementations, the first and second correlations are increased by increasing absolute magnitudes of a first subset of the first weights and absolute magnitudes of a second subset of the second weights respectively corresponding to the first subset of the joint locations; and decreasing absolute magnitudes of the remaining first weights and absolute magnitudes of the remaining second weights.

In some implementations, the first weights and the second weights are combined as a weight matrix in series with respective rows of the weight matrix corresponding to the respective first and second RNN elements, and determining the first and second weights comprises determining the first and second weights by a $L_{2,1}$ norm of a transpose of the weight matrix.

In some implementations, determining the first and second weights comprises determining the first and second weights by decreasing a sum of absolute magnitudes of the first weights and the second weights.

In some implementations, the method further comprises determining, based on the joint locations and the predefined action label, third weights for mapping the joint locations to a third feature for the frame generated by a third RNN element in the learning network and fourth weights for mapping the joint locations to a fourth feature for the frame generated by a fourth RNN element in the learning network, by increasing absolute magnitudes of a third subset of the third weights and absolute magnitudes of a fourth subset of the fourth weights respectively corresponding to the joint locations. The probability is generated by the classification element further based on the third and fourth features. The second subset of the joint locations being different from first subset of the joint locations.

In some implementations, the first RNN element includes a first long short-term memory (LSTM) element and the second RNN element includes a second LSTM element.

In some implementations, the first LSTM element includes a first set of units and the second LSTM element includes a second set of units, and the first weights include first intermediate weights for the first set of units and the second weights include second intermediate weights for the second set of units. In these implementations, determining the first and second weights further comprises in one of a plurality of iterations: selecting at least one unit from the first set of units and the second set of units; masking the selected unit in the first and second sets; updating first intermediate weights for mapping the joint locations to first intermediate features generated by the units in the first set which are not masked and updating second intermediate weights for mapping the joint locations to second intermediate features generated by the units in the second set which are not masked.

In some implementations, selecting at least one unit comprises selecting at least one unit from the first set of units and the second set of units based on a predetermined proportion.

Figure 10:
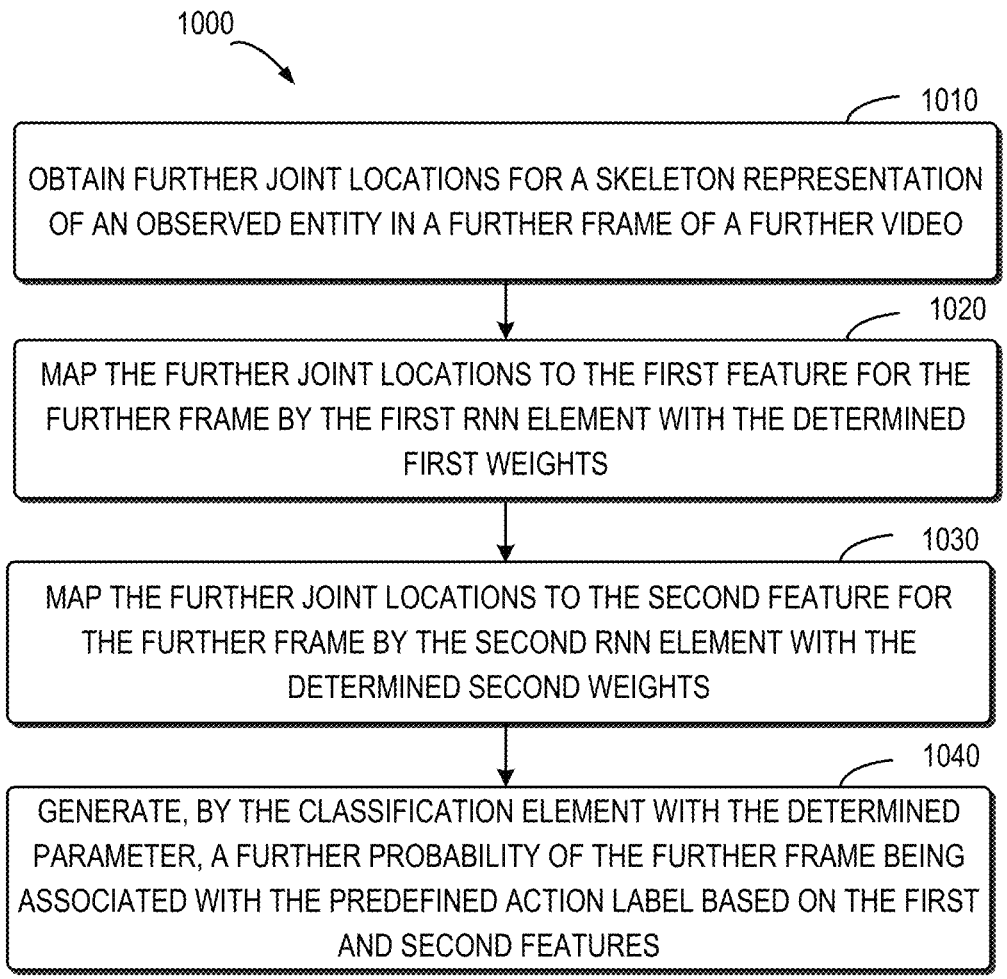
FIG. 10 illustrates a flowchart of a method of action detection in accordance with another implementation of the subject matter described herein.

FIG. 10 shows a flowchart of a method of action detection 1000 in accordance with another implementation of the subject matter described herein. The method 1000 may be implemented by the learning unit 126 in FIG. 1 to detect a predefined action for an incoming frame. As shown, in step 1010, further joint locations for a skeleton representation of an observed entity in a further frame of a further video are obtained. In step 1020 the further joint locations are mapped to the first feature for the further frame by the first RNN element with the determined first weights. In step 1030, the further joint locations are mapped to the second feature for the further frame by the second RNN element with the determined second weights. Then in step 1040, a further probability of the further frame being associated with the predefined action label is generated based on the first and second features by the classification element with the determined parameter.

It would be appreciated that although the operations of the method 900 or 1000 are shown in a sequential order, some of the operations may be performed simultaneously, in parallel, or in a different order. For example, the determining operations in steps 920 and 930 and/or the determining operations in steps 1020 and 1030 may be performed simultaneously or inversely (for example, by using the back propagation).

It would also be appreciated that although the structure of the learning network and the training method for the learning network is described in the context of action detection from a video, in some other implementations, the structure of the learning network and the corresponding training method may be applied in other scenarios such as audio detection or wording analysis.

Figure 11:
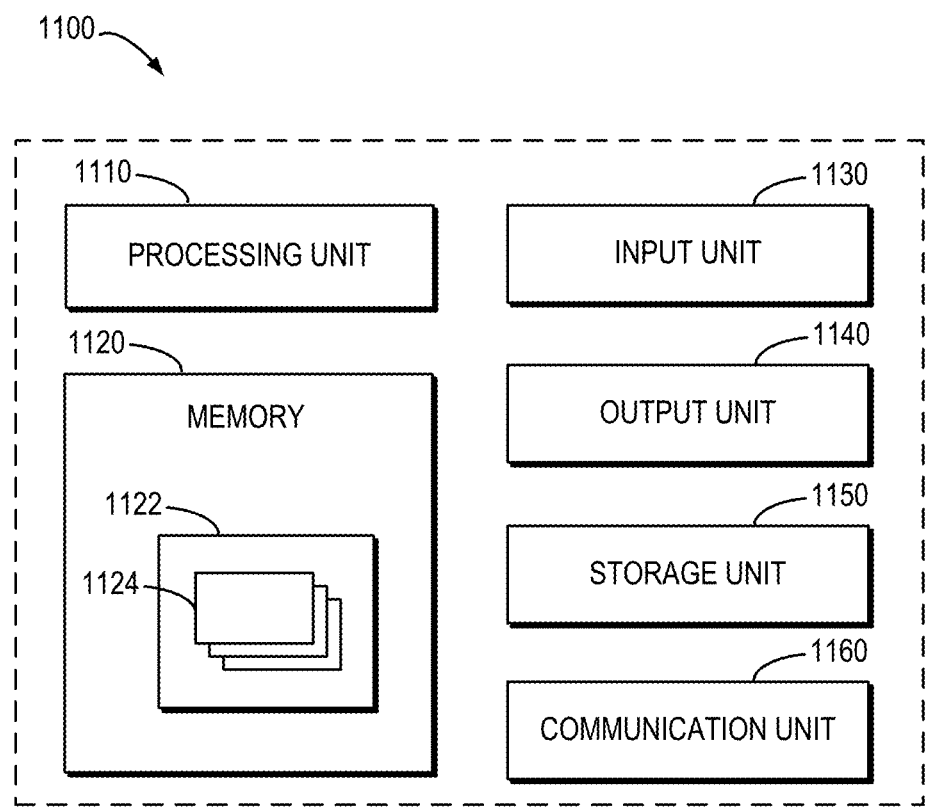
FIG. 11 illustrates a block diagram of an example computing system/server in which one or more implementations of the subject matter described herein may be implemented.

FIG. 11 shows a block diagram of an example computing system/server 1100 in which one or more implementations of the subject matter described herein may be implemented. The model building system 110, the model executing system 120, or both of them may be implemented by the computing system/server 1100. The computing system/server 1100 as shown in FIG. 11 is only an example, which should not be constructed as any limitation to the function and scope of use of the implementations of the subject matter described herein.

As shown in FIG. 11, the computing system/server 1100 is in a form of a general-purpose computing device. Components of the computing system/server 1100 may include, but are not limited to, one or more processors or processing units 1110, a memory 1120, one or more input devices 1130, one or more output devices 1140, storage 1150, and one or more communication units 1160. The processing unit 1110 may be a real or a virtual processor and is capable of performing various processes in accordance with a program stored in the memory 1120. In a multi-processing system, multiple processing units execute computer-executable instructions to increase processing power.

The computing system/server 1100 typically includes a variety of machine readable medium. Such medium may be any available medium that is accessible by the computing system/server 1100, including volatile and non-volatile medium, removable and non-removable medium. The memory 1120 may be volatile memory (e.g., registers, cache, a random-access memory (RAM)). non-volatile memory (e.g., a read only memory (ROM), an electrically erasable programmable read only memory (EEPROM), a flash memory), or some combination thereof. The storage 1150 may be removable or non-removable, and may include machine readable medium such as flash drives, magnetic disks or any other medium which can be used to store information and which can be accessed within the computing system/server 1100.

The computing system/server 1100 may further include other removable/non-removable, volatile/non-volatile computing system storage medium. Although not shown in FIG. 11, a disk driver for reading from or writing to a removable, non-volatile disk (e.g., a "floppy disk"), and an optical disk driver for reading from or writing to a removable, non-volatile optical disk can be provided. In these cases, each driver can be connected to the bus 18 by one or more data medium interfaces. The memory 1120 may include at least one program product having a set (e.g., at least one) of program modules that are configured to carry out the functions of various implementations of the subject matter described herein.

A program/utility tool 1122 having a set (at least one) of the program modules 1124 may be stored in, for example, the memory 1120. Such program modules 1124 include, but are not limited to, an operating system, one or more applications, other program modules, and program data. Each or a certain combination of these examples may include an implementation of a networking environment. The program modules 1124 generally carry out the functions and/or methodologies of implementations of the subject matter described herein, for example, the method 900 and/or the method 1000.

The input unit(s) 1130 may be one or more of various different input devices. For example, the input unit(s) 1130 may include a user device such as a mouse, keyboard, trackball, etc. The input unit(s) 1130 may implement one or more natural user interface techniques, such as speech recognition or touch and stylus recognition. As other examples, the input unit(s) 1130 may include a scanning device, a network adapter, or another device that provides input to the computing system/server 1100. The output unit(s) 1140 may be a display, printer, speaker, network adapter, or another device that provides output from the computing system/server 1100. The input unit(s) 1130 and output unit(s) 1140 may be incorporated in a single system or device, such as a touch screen or a virtual reality system.

The communication unit(s) 1160 enables communication over communication medium to another computing entity. Additionally, functionality of the components of the computing system/server 1100 may be implemented in a single computing machine or in multiple computing machines that are able to communicate over communication connections. Thus, the computing system/server 1100 may operate in a networked environment using logical connections to one or more other servers, network personal computers (PCs), or another common network node. By way of example, and not limitation, communication media include wired or wireless networking techniques.

The computing system/server 1100 may also communicate, as required, with one or more external devices (not shown) such as a storage device, a display device, and the like, one or more devices that enable a user to interact with the computing system/server 1100, and/or any device (e.g., network card, a modem, etc.) that enables the computing system/server 1100 to communicate with one or more other computing devices. Such communication may be performed via an input/output (I/O) interface(s) (not shown).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some implementations of the subject matter described herein are listed below.

In some implementations, a device is provided. The device comprises a processing unit and a memory coupled to the processing unit and storing instructions thereon, the instructions, when executed by the processing unit, causing the device to obtain joint locations for a skeleton representation of an observed entity in a frame of a video and a predefined action label for the frame; determine, based on the joint locations and the predefined action label, first weights for mapping the joint locations to a first feature for the frame generated by a first recurrent neural network (RNN) element in a learning network and second weights for mapping the joint locations to a second feature for the frame generated by a second RNN element in the learning network, by increasing a first correlation between the first feature and a first subset of the joint locations and a second correlation between the second feature and the first subset of the joint locations; and determine, based on the joint locations and the predefined action label, a parameter for a classification element included in the learning network by increasing a probability of the frame being associated with the predefined action label, the probability being generated by the classification element at least based on the first and second features.

In some implementations, the instructions, when executed by the processing unit, further cause the device to increase the first and second correlations by increasing absolute magnitudes of a first subset of the first weights and absolute magnitudes of a second subset of the second weights respectively corresponding to the first subset of the joint locations; and decreasing absolute magnitudes of the remaining first weights and absolute magnitudes of the remaining second weights.

In some implementations, the first weights and the second weights are combined as a weight matrix with respective rows of the weight matrix corresponding to the respective first and second RNN elements, and the instructions, when executed by the processing unit, cause the device to determine the first and second weights by decreasing a $L_{2,1}$ norm of a transpose of the weight matrix.

In some implementations, the instructions, when executed by the processing unit, further cause the device to determine the first and second weights by decreasing a sum of absolute magnitudes of the first weights and the second weights.

In some implementations, the instructions, when executed by the processing unit, further cause the device to determine, based on the joint locations and the predefined action label, third weights for mapping the joint locations to a third feature for the frame generated by a third RNN element in the learning network and fourth weights for mapping the joint locations to a fourth feature for the frame generated by a fourth RNN element in the learning network, by increasing a third correlation between the third feature and a second subset of the joint locations and a fourth correlation between the fourth feature and the second subset of the joint locations, the second subset of the joint locations being different from first subset of the joint locations. The probability is generated by the classification element further based on the third and fourth features.

In some implementations, the first RNN element includes a first long short-term memory (LSTM) element and the second RNN element includes a second LSTM element.

In some implementations, the first LSTM element includes a first set of units and the second LSTM element includes a second set of units, and the first weights include first intermediate weights for the first set of units and the second weights include second intermediate weights for the second set of units. In these implementations, the instructions, when executed by the processing unit, further cause the device to: select at least one unit from the first set of units and the second set of units; mask the selected unit in the first and second sets; update the first intermediate weights for mapping the joint locations to first intermediate features generated by the units in the first set which are not masked; and update the second intermediate weights for mapping the joint locations to second intermediate features generated by the units in the second set which are not masked.

In some implementations, the instructions, when executed by the processing unit, further cause the device to select at least one unit from the first set of units and the second set of units based on a predetermined proportion.

In some implementations, the instructions, when executed by the processing unit, further cause the device to: obtain further joint locations for a skeleton representation of an observed entity in a further frame of a further video; map the further joint locations to the first feature for the further frame by the first RNN element with the determined first weights; map the further joint locations to the second feature for the further frame by the second RNN element with the determined second weights; and generate, by the classification element with the determined parameter, a further probability of the further frame being associated with the predefined action label based on the first and second features.

In some implementations, a method is proposed. The method comprises obtaining joint locations for a skeleton representation of an observed entity in a frame of a video and a predefined action label for the frame; determining, based on the joint locations and the predefined action label, first weights for mapping the joint locations to a first feature for the frame generated by a first recurrent neural network (RNN) element in a learning network and second weights for mapping the joint locations to a second feature for the frame generated by a second RNN element in the learning network, by a first correlation between the first feature and a first subset of the joint locations and a second correlation between the second feature and the first subset of the joint locations; and determining, based on the joint locations and the predefined action label, a parameter for a classification element included in the learning network by increasing a probability of the frame being associated with the predefined action label, the probability being generated by the classification element at least based on the first and second features.

In some implementations, increasing the first and second correlations by increasing absolute magnitudes of a first subset of the first weights and absolute magnitudes of a second subset of the second weights respectively corresponding to the first subset of the joint locations; and decreasing absolute magnitudes of the remaining first weights and absolute magnitudes of the remaining second weights.

In some implementations, the first weights and the second weights are combined as a weight matrix with respective rows of the weight matrix corresponding to the respective first and second RNN elements, and determining the first and second weights comprises determining the first and second weights by decreasing a $L_{2,1}$ norm of a transpose of the weight matrix.

In some implementations, determining the first and second weights comprises determining the first and second weights by decreasing a sum of absolute magnitudes of the first weights and the second weights.

In some implementations, the method further comprises determining, based on the joint locations and the predefined action label, third weights for mapping the joint locations to a third feature for the frame generated by a third RNN element in the learning network and fourth weights for mapping the joint locations to a fourth feature for the frame generated by a fourth RNN element in the learning network, by increasing a third correlation between the third feature and a second subset of the joint locations and a fourth correlation between the fourth feature and the second subset of the joint locations, the second subset of the joint locations being different from first subset of the joint locations. The probability is generated by the classification element further based on the third and fourth features.

In some implementations, the first RNN element includes a first long short-term memory (LSTM) element and the second RNN element includes a second LSTM element.

In some implementations, the first LSTM element includes a first set of units and the second LSTM element includes a second set of units, and the first weights include first intermediate weights for the first set of units and the second weights include second intermediate weights for the second set of units. In these implementations, determining the first and second weights further comprises: selecting at least one unit from the first set of units and the second set of units; masking the selected unit in the first and second sets; updating first intermediate weights for mapping the joint locations to first intermediate features generated by the units in the first set which are not masked; and updating second intermediate weights for mapping the joint locations to second intermediate features generated by the units in the second set which are not masked.

In some implementations, selecting the at least one unit comprises selecting at least one unit from the first set of units and the second set of units based on a predetermined proportion.

In some implementations, the method further comprises obtaining further joint locations associated with an observed entity in a further frame of a further video; mapping the further joint locations to the first feature for the further frame by the first RNN element with the determined first weights; mapping the further joint locations to the second feature for the further frame by the second RNN element with the determined second weights; and generating, by the classification element with the determined parameter, a further probability of the further frame being associated with the predefined action label based on the first and second features.

In some implementations, a computer program product is proposed. The computer program product is tangibly stored on a non-transient machine-readable medium and comprises machine-executable instructions, the instructions, when executed on at least one processor of a device, causing the device to: obtain joint locations for a skeleton representation of an observed entity in a frame of a video and a predefined action label for the frame; determine, based on the joint locations and the predefined action label, first weights for mapping the joint locations to a first feature for the frame generated by a first recurrent neural network (RNN) element in a learning network and second weights for mapping the joint locations to a second feature for the frame generated by a second RNN element in the learning network, by increasing a first correlation between the first feature and a first subset of the joint locations and a second correlation between the second feature and the first subset of the joint locations; and determine, based on the joint locations and the predefined action label, a parameter for a classification element included in the learning network by increasing a probability of the frame being associated with the predefined action label, the probability being generated by the classification element at least based on the first and second features.

In some implementations, the instructions, when executed on at least one processor of a device, further cause the device to increase the first and second correlations by increasing absolute magnitudes of a first subset of the first weights and absolute magnitudes of a second subset of the second weights respectively corresponding to the first subset of the joint locations; and decreasing absolute magnitudes of the remaining first weights and absolute magnitudes of the remaining second weights.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:
1. A device comprising:
a processing unit;
a memory coupled to the processing unit and storing instructions thereon, the instructions, when executed by the processing unit, causing the device to:
obtain joint locations for a skeleton representation of an observed entity in a frame of a video and a predefined action label for the frame;
determine, based on the joint locations and the predefined action label, first weights for mapping the joint locations to a first feature for the frame generated by a first recurrent neural network (RNN) element in a learning network and second weights for mapping the joint locations to a second feature for the frame generated by a second RNN element in the learning network, by increasing a first correlation between the first feature and a first subset of the joint locations and a second correlation between the second feature and the first subset of the joint locations; and
determine, based on the joint locations and the predefined action label, a parameter for a classification element included in the learning network by increasing a probability of the frame being associated with the predefined action label; the probability being generated by the classification element at least based on the first and second features.

2. The device of claim 1, wherein the instructions, when executed by the processing unit, further cause the device to increase the first and second correlations by:
increasing absolute magnitudes of a first subset of the first weights and absolute magnitudes of a second subset of the second weights respectively corresponding to the first subset of the joint locations; and
decreasing absolute magnitudes of the remaining first weights and absolute magnitudes of the remaining second weights.

3. The device of claim 2, wherein the first weights and the second weights are combined as a weight matrix with respective rows of the weight matrix corresponding to the respective first and second RNN elements, and the instructions, when executed by the processing unit, cause the device to determine the first and second weights by:
decreasing a $L_{2,1}$ norm of a transpose of the weight matrix.

4. The device of claim 1, wherein the instructions, when executed by the processing unit, further cause the device to determine the first and second weights by:
decreasing a sum of absolute magnitudes of the first and second weights.

5. The device of claim 1, wherein the instructions, when executed by the processing unit, farther cause the device to:
determine, based on the joint locations and the predefined action label, third weights for mapping the joint locations to a third feature for the frame generated by a third RNN element in the learning network and fourth weights for mapping the joint locations to a fourth feature for the frame generated by a fourth RNN element in the learning network, by increasing a third correlation between the third feature and a second subset of the joint locations and a fourth correlation between the fourth feature and the second subset of the joint locations, the second subset of the joint locations being different from first subset of the joint locations; and
wherein the probability is generated by the classification element further based on the third and fourth features.

6. The device of claim 1, wherein the first RNN element includes a first long short-term memory (LSTM) element and the second RNN element includes a second LSTM element.

7. The device of claim 6, wherein the first LSTM element includes a first set of units and the second LSTM element includes a second set of units, and the first weights include first intermediate weights for the first set of units and the second weights include second intermediate weights for the second set of units; and wherein the instructions, when executed by the processing unit, further cause the device in one of a plurality of iterations, select at least one unit from the first set of units and the second set of units;

mask the selected unit in the first and second sets;

update the first intermediate weights for mapping the joint locations to first intermediate features generated by the units in the first set which are not masked; and update the second intermediate weights for mapping the joint locations to second intermediate features generated by the units in the second set which are not masked.

8. The device of claim 7, wherein the instructions, when executed by the processing unit, further cause the device to:

select at least one unit from the first set of units and the second set of units based on a predetermined proportion.

9. The device of claim 1, wherein the instructions, when executed by the processing unit, further cause the device to:

obtain further joint locations for a skeleton representation of an observed entity in a further frame of a further video;

map the farther joint locations to the first feature for the farther frame by the first RNN element with the determined first weights;

map the further joint locations to the second feature for the further frame by the second RNN element with the determined second weights; and generate, by the classification element with the determined parameter, a further probability of the further frame being associated with the predefined action label based on the first and second features.

10. A method comprising:

obtaining joint locations for a skeleton representation of an observed entity in a frame of a video and a predefined action label for the frame;

determining, based on the joint locations and the predefined action label, first weights for mapping the joint locations to a first feature for the frame generated by a first recurrent neural network (RNN) element in a learning network and second weights for mapping the joint locations to a second feature for the frame generated by a second RNN element in the learning network, by increasing a first correlation between the first feature and a first subset of the joint locations and a second correlation between the second feature and the first subset of the joint locations; and determining, based on the joint locations and the predefined action label, a parameter for a classification element included in the learning network by increasing a probability of the frame being associated with the predefined action label, the probability being generated by the classification element at least based on the first and second features.

11. The method of claim 10, wherein increasing the first and second correlations comprises:

increasing absolute magnitudes of a first subset of the first weights and absolute magnitudes of a second subset of the second weights respectively corresponding to the first subset of the joint locations; and decreasing absolute magnitudes of the remaining first weights and absolute magnitudes of the remaining second weights.

12. The method of claim 11, wherein the first weights and the second weights are combined as a weight matrix with respective rows of the weight matrix corresponding to the respective first and second RNN elements, and determining the first and second weights comprises:

determining the first and second weights by decreasing a $L_{2,1}$ norm of a transpose of the weight matrix.

13. The method of claim 10, wherein determining the first and second weights comprises:

determining the first and second weights by decreasing a sum of absolute magnitudes of the first weights and the second weights.

14. The method of claim 10, further comprising:

determining, based on the joint locations and the predefined action label, third weights for mapping the joint locations to a third feature for the frame generated by a third RNN element in the learning network and fourth weights for mapping the joint locations to a fourth feature for the frame generated by a fourth RNN element in the learning network, by increasing a third correlation between the third feature and a second subset of the joint locations and a fourth correlation between the fourth feature and the second subset of the joint locations, the second subset of the joint locations being different from first subset of the joint locations; and wherein the probability is generated by the classification element further based on the third and fourth features.

15. The method of claim 10, wherein the first INN element includes a first long short-term memory (LSTM) element and the second RNN element includes a second LSTM element.

16. The method of claim 15, wherein the first LSTM element includes a first set of units and the second LSTM element includes a second set of units, and the first weights include first intermediate weights for the first set of units and the second weights include second intermediate weights for the second set of units, and wherein determining the first and second weights further comprises, in one of a plurality of iterations, selecting at least one unit from the first set of units and the second set of nits;

masking the selected unit in the first and second sets;

updating first intermediate weights for mapping the joint locations to first intermediate features generated by the units in the first set which are not masked; and updating second intermediate weights for mapping the joint locations to second intermediate features generated by the units in the second set which are not masked.

17. The method of claim 16, wherein selecting the at least one unit comprises:

selecting at least one unit from the first set of units and the second set of units based on a predetermined proportion.

18. The method of claim 10, further comprising:

obtaining further joint locations for a skeleton representation of an observed entity in a further frame of a further video;

mapping the further joint locations to the first feature for the further frame by the first RNN element with the determined first weights;

mapping the further joint locations to the second feature for the further frame by the second RNN element with the determined second weights; and generating, by the classification element with the determined parameter, a further probability of the farther frame being associated with the predefined action label based on the first and second features.

19. A computer program product being tangibly stored on a non-transient machine-readable medium, and comprising machine-executable instructions, the instructions, when executed on at least one processor of a device; causing the device to:

obtain joint locations for a skeleton representation of an observed entity in a frame of a video and a predefined action label for the frame;

determine; based on the joint locations and the predefined action label; first weights for mapping the joint locations to a first feature for the frame generated by a first recurrent neural network (RNN) element in a learning network and second weights for mapping the joint locations to a second feature for the frame generated by a second RNN element in the learning network, by increasing a first correlation between the first feature and a first subset of the joint locations and a second correlation between the second feature and the first subset of the joint locations; and determine, based on the joint locations and the predefined action label, a parameter for a classification element included in the learning network by increasing a probability of the frame being associated with the predefined action label, the probability being generated by the classification element at least based on the first and second features.

20. The computer program product of claim 19, wherein the instructions, when executed on at least one processor of a device, further cause the device to increase the first and second correlations by:

increasing absolute magnitudes of a first subset of the first weights and absolute magnitudes of a second subset of the second weights respectively corresponding to the first subset of the joint locations; and determining the first and second weights by decreasing absolute magnitudes of the remaining first weights and absolute magnitudes of the remaining second weights.

* * * * *